US012238648B2

(12) United States Patent
Yang et al.

(10) Patent No.: US 12,238,648 B2
(45) Date of Patent: Feb. 25, 2025

(54) METHODS, APPARATUS AND SYSTEMS FOR DETERMINING A RESOURCE FOR WAKE-UP SIGNAL TRANSMISSIONS

(71) Applicant: ZTE Corporation, Shenzhen (CN)

(72) Inventors: Weiwei Yang, Shenzhen (CN); Bo Dai, Shenzhen (CN); Kun Liu, Shenzhen (CN); Huiying Fang, Shenzhen (CN); Luanjian Bian, Shenzhen (CN); Youjun Hu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 301 days.

(21) Appl. No.: 17/736,789

(22) Filed: May 4, 2022

(65) Prior Publication Data
US 2023/0021951 A1 Jan. 26, 2023

Related U.S. Application Data

(63) Continuation of application No. PCT/CN2019/116187, filed on Nov. 7, 2019.

(51) Int. Cl.
H04W 52/02 (2009.01)
H04W 68/00 (2009.01)
H04W 76/28 (2018.01)

(52) U.S. Cl.
CPC ..... *H04W 52/0232* (2013.01); *H04W 68/005* (2013.01); *H04W 76/28* (2018.02)

(58) Field of Classification Search
CPC ......... H04W 52/0232; H04W 52/0219; H04W 52/0229; H04W 68/005; H04W 68/025; H04W 68/02; H04W 72/0446
See application file for complete search history.

(56) References Cited

U.S. PATENT DOCUMENTS 11,272,451 B2  3/2022  Liu et al.
11,722,960 B2  8/2023  Freda et al.
(Continued)

FOREIGN PATENT DOCUMENTS

CN  109309555 A  2/2019
CN  109792364 A  5/2019
(Continued)

OTHER PUBLICATIONS

Examination Report issued in related Indian Application No. 202217031878 mailed Jan. 9, 2023 (5 pages).
Ratasuk et al. "Overview of narrowband IoT in LTE Rel-13" Oct. 31, 2016 (7 pages).
Supplementary European Search Report for European Application No. 19 95 1417.5 mailed Jun. 15, 2023 (13 pages).
(Continued)

*Primary Examiner* — Jamal Javaid
(74) *Attorney, Agent, or Firm* — Crowell & Moring LLP

(57) ABSTRACT

Methods, apparatus and systems for determining a transmission resource for transmitting a wake-up signal in a wireless communication are described. In one embodiment, a method performed by a wireless communication node is disclosed. The method comprises: determining an initial transmission resource for wake-up signal (WUS) transmission; determining an updated transmission resource for WUS transmission based at least on the initial transmission resource and an offset; and transmitting, on the updated transmission resource, a WUS to at least one wireless communication device, wherein the offset is selected from a plurality of predetermined values based on a location of a paging occasion (PO) corresponding to the WUS.

20 Claims, 7 Drawing Sheets

(56) References Cited

U.S. PATENT DOCUMENTS

| | | | |
|---|---|---|---|
| 11,777,682 B2 | 10/2023 | Liu et al. | |
| 11,818,685 B2 | 11/2023 | Hwang et al. | |
| 2013/0308555 A1* | 11/2013 | Ho | H04L 5/0048 370/328 |
| 2019/0150114 A1* | 5/2019 | Liu | H04W 52/0229 370/252 |
| 2021/0021299 A1* | 1/2021 | Kumar | H04B 1/7156 |

FOREIGN PATENT DOCUMENTS

| | | |
|---|---|---|
| CN | 109923914 A | 6/2019 |
| CN | 110299978 A | 10/2019 |
| TW | 201921995 A | 6/2019 |
| WO | WO 2018/175760 A1 | 9/2018 |
| WO | WO 2018/204799 A1 | 11/2018 |
| WO | WO 2019/019960 A1 | 1/2019 |
| WO | WO 2019/033112 A1 | 2/2019 |
| WO | WO 2019/055417 A1 | 3/2019 |
| WO | WO 2019/069504 A1 | 4/2019 |
| WO | WO 2019/086674 A1 | 5/2019 |
| WO | WO 2019/158603 A1 | 8/2019 |
| WO | WO 2019/160496 A1 | 8/2019 |
| WO | WO 2018/161244 A1 | 9/2019 |
| WO | WO 2019/169359 A1 | 9/2019 |

OTHER PUBLICATIONS

Qualcomm Incorporated, "UE-group wake-up signal for MTC", 3GPP TSG RAN WG1 NR Ad-Hoc#2, R1-1910716, Oct. 5, 2019 (6 pages).

Huawei, "On wake-up signal for eFeMTC", 3GPP TSG RAN WG1, R1-1805979, May 11, 2018 (6 page).

Ericsson, "Further topics for UE-group wake-up signal in NB-IoT", 3GPP TSG RAN WG1, RI-1911384, Oct. 22, 2019 (5 page).

Qualcomm Incorporated, "Advanced Grant Indication for UE Power Saving", 3GPP TSG RAN WG1 NR Ad-Hoc#2, R1-1711187, Jun. 30, 2017 (5 pages).

International Search Report and Written Opinion for International Application No. PCT/CN2019/116187 filed Nov. 7, 2019 mailed Jul. 30, 2020 (6 pages).

Office Action issued in related Chinese Application No. 201980102112.9 dated Mar. 29, 2024, w/ translation (20 pages).

Qualcomm Incorporated, "UE-group wake-up signal for NB-IoT", 3GPP TSG RAN WG1 #98bis, R1-1910725, Oct. 14, 2019 (3 pages).

Intel Corporation, "Open issue in WUS", 3GPP TSG RAN WG2 Meeting #0 102, R2-1807524 (Revision of R2-1804897), May 21, 2018 (4 pages).

ZTE, "Discussion on Wake-up signal for NB-IoT", 3GPP TSG RAN WG1 Meeting #97, R1-1906505, May 13, 2019 (10 pages).

\* cited by examiner

METHODS, APPARATUS AND SYSTEMS FOR DETERMINING A RESOURCE FOR WAKE-UP SIGNAL TRANSMISSIONS

CROSS-REFERENCE TO RELATED APPLICATIONS

This application is a continuation of International Patent Application No. PCT/CN2019/116187, filed Nov. 7, 2019. The contents of International Patent Application No. PCT/CN2019/116187 are incorporated by reference herein in their entirety.

TECHNICAL FIELD

The disclosure relates generally to wireless communications and, more particularly, to methods, apparatus and systems for determining a transmission resource for transmitting a wake-up signal in a wireless communication.

BACKGROUND

Machine type communication (MTC), including machine to machine (M2M) communication and narrowband Internet of Things (NB-IoT), is a main application form of the Internet of Things. MTC devices may be based on the Global System of Mobile communication (GSM) system or the fifth generation new radio (5G NR) system.

In a 5G NR system, the network can send a paging message to a terminal, e.g. a user equipment (UE), which is in an idle state and a connected state. A paging process may be triggered by a core network for informing a UE to receive a paging request, or triggered by a base station, e.g. an evolutional Node B (eNB), for notifying a system information update. The paging message is scheduled using a physical downlink control channel (PDCCH) scrambled by a radio network temporary identifier (RNTI); and is transmitted on a physical downlink shared channel (PDSCH). The terminal monitors the PDCCH at a corresponding paging occasion (PO), to determine whether a paging message is carried on the PDSCH indicated by the PDCCH. If the terminal does not detect the PDCCH at the corresponding PO, it means that no paging message is at the corresponding PO. As such, the terminal enters a sleep state, and does not receive data until the next PO for another paging message detection. This mode is called Discontinuous Reception (DRX). That is, the terminal needs to perform blind detection of the PDCCH at each PO, which induces a large power consumption at the terminal.

In order to reduce the power consumption of the terminal, a wake-up signal (WUS) is introduced. Before each PO, the base station sends a WUS indicating whether to perform PDCCH detection. The terminal detects the WUS first, and determines whether to detect the corresponding PDCCH according to the detection result of the WUS. When the WUS is detected, the terminal detects the PDCCH corresponding to the WUS. Otherwise, the terminal does not detect the PDCCH. The introduction of the WUS signal reduces the number of times for the terminal to detect the PDCCH, thereby saving power of the terminal.

A conventional WUS is used for all terminals allocated to a same PO. That is, when there is a need to wake up any terminal among the terminals at the same PO, the base station will send a WUS. Then, other terminals at the same PO will also be woken up to detect PDCCH, which increases the number of times of unnecessary PDCCH detections at these terminals. Therefore, a group WUS is introduced to divide multiple terminals into different groups, each of which corresponds to a different group WUS and only responds to that corresponding group WUS for PDCCH detection.

For example, a gap with respect to a PO may correspond to N WUS resources: {WUS resource location 1, WUS resource location 2 . . . WUS resource location N}. For a terminal or UE, if its corresponding group WUS is fixed to a WUS resource location, there are some issues. First, if the fixed WUS resource is a legacy WUS resource, then the UE is always influenced when the legacy UE is woken up. That is, compared to other UEs whose group WUS is not at legacy WUS resource, the UE is more likely to be woken up by mistake. Second, if the fixed WUS resource is always located at the front of the N WUS resources, then the UE is always woken up in advance before other UEs corresponding to the remaining WUS resources. That is, compared to other UEs whose group WUS is at a later location of the N WUS resources, the UE wastes more power because of the earlier wake-up.

Thus, existing systems and methods for resource allocation for transmitting WUS or group WUS in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication node is disclosed. The method comprises: determining an initial transmission resource for wake-up signal (WUS) transmission; determining an updated transmission resource for WUS transmission based at least on the initial transmission resource and an offset; and transmitting, on the updated transmission resource, a WUS to at least one wireless communication device, wherein the offset is selected from a plurality of predetermined values based on a location of a paging occasion (PO) corresponding to the WUS.

In another embodiment, a method performed by a wireless communication device is disclosed. The method comprises: obtaining information about an initial transmission resource for wake-up signal (WUS) detection; determining an updated transmission resource for WUS detection based at least on the initial transmission resource and an offset; and detecting, on the updated transmission resource, a WUS transmitted from a wireless communication node, wherein the offset is selected from a plurality of predetermined values based on a location of a paging occasion (PO) corresponding to the WUS.

In a different embodiment, a wireless communication node configured to carry out a disclosed method in some embodiment is disclosed.

In yet another embodiment, a wireless communication device configured to carry out a disclosed method in some embodiment is disclosed.

In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
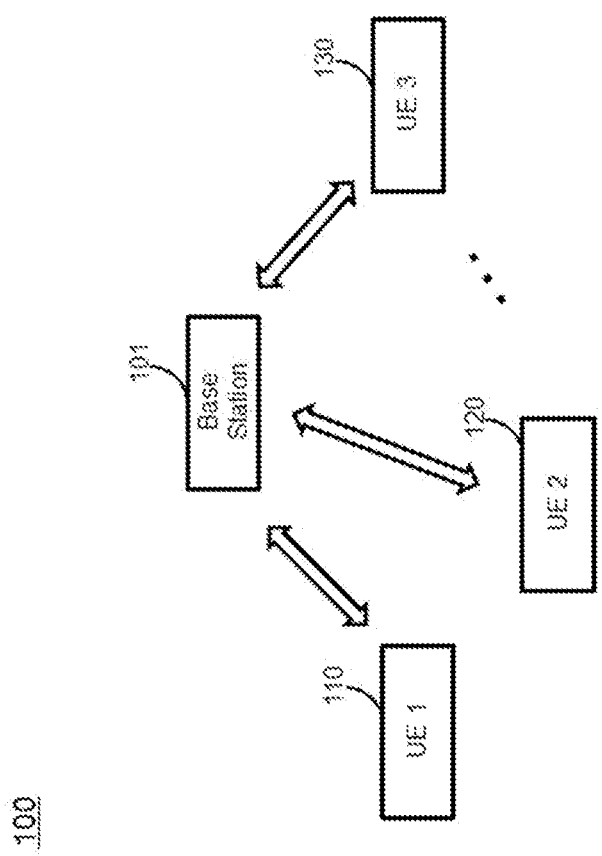
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. To reduce the number of times the terminal blindly detects the Physical Downlink Control Channel (PDCCH) signals during a paging process, and to save the power consumption of the terminal, a wake-up signal (WUS) is transmitted before each paging occasion (PO) to indicate whether to perform PDCCH detection. To avoid unnecessary PDCCH detections of UEs at the same PO as the UE which BS has intent to wake up, a group WUS is introduced for each UE to only respond to a corresponding group WUS for PDCCH detection. But if a group WUS corresponding one UE is fixed to a WUS resource location, there will be unfairness between UEs due to different locations of their corresponding group WUS resources.

To avoid this unfairness between UEs, the present disclosure provides systems and methods for allocating resources for WUS transmissions, such that a group WUS corresponding to a UE is transmitted on different group WUS resources for different POs. For example, the BS determines an initial transmission resource for WUS transmission; and determines an updated transmission resource for WUS transmission to a UE based at least on the initial transmission resource and an offset. The offset may be calculated based on a portion of a pseudo random sequence that is generated based on an initial value. In one embodiment, the initial value may be determined based on: an identity (ID) of a cell where the UE is located, and/or a discontinuous reception (DRX) cycle specific to the cell or the UE. The BS transmits, on the updated transmission resource, a WUS to the UE. The UE can determine the updated transmission resource in a similar manner and detect the WUS at the updated transmission resource. The offset calculation may be performed in different schemes according to different embodiments, where each offset calculation scheme is designed to provide a fair resource allocation for WUS transmissions and detections with respect to different UEs.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. These UEs have been selected into the cellular network of the BS 101 based on a cell selection process. When the BS 101 has data or any information to be transmitted to any UE, the BS 101 can start a paging process. The paging process may be triggered by the BS 101 to notify a UE to receive a paging request, or be triggered by the BS 101 to notify a system information update to the UEs 110, 120, 130. A paging message is scheduled by PDCCH information scrambled by a Paging-Radio Network Temporary Identifier (RNTI), and is transmitted in a PDSCH. Since a PDCCH is relatively long, it costs lots of unnecessary power for the terminal to blindly detect the PDCCH signal during a paging process. As such, the BS 101 can broadcast a WUS to indicate a detection of a PDCCH to the UEs 110, 120, 130. Each UE detects the wake up signal first and then determines whether to detect the PDCCH according to the detection result. A wake up signal may correspond to two states: a wake up state and a sleep state. In this case, the UE will only detect the PDCCH when the wake up signal is detected and has a wake up state.

But when a WUS is broadcasted to wake up one UE, other UEs at the same PO will also be woken up to perform unnecessary PDCCH detections of UEs. As such, the BS 101 can transmit a group WUS to a corresponding group of UEs, e.g. group 1 including UE 1, UE 2, but not UE 3 and other UEs. Then only UE 1 and UE 2, but not other UEs, will perform PDCCH detection after detecting the group WUS. To avoid unfairness between UEs due to different locations of their corresponding group WUS resources, various resource allocation schemes for WUS transmissions and detections with respect to different UEs will be discussed later in detail, e.g. based on a calculation of an offset value relative to an initial or previous transmission resource index.

When the grouping is based on a service type, e.g., based on a paging probability of a service type, any one group may include one or more subgroups, where each group corresponds to a paging probability interval having a same length. For a terminal without a paging probability, it corresponds to a specific paging probability interval, or a specific group, or a specific paging probability. In one example, a specific paging probability is a paging probability of 0, 100, null, or infinity.

Figure 2:
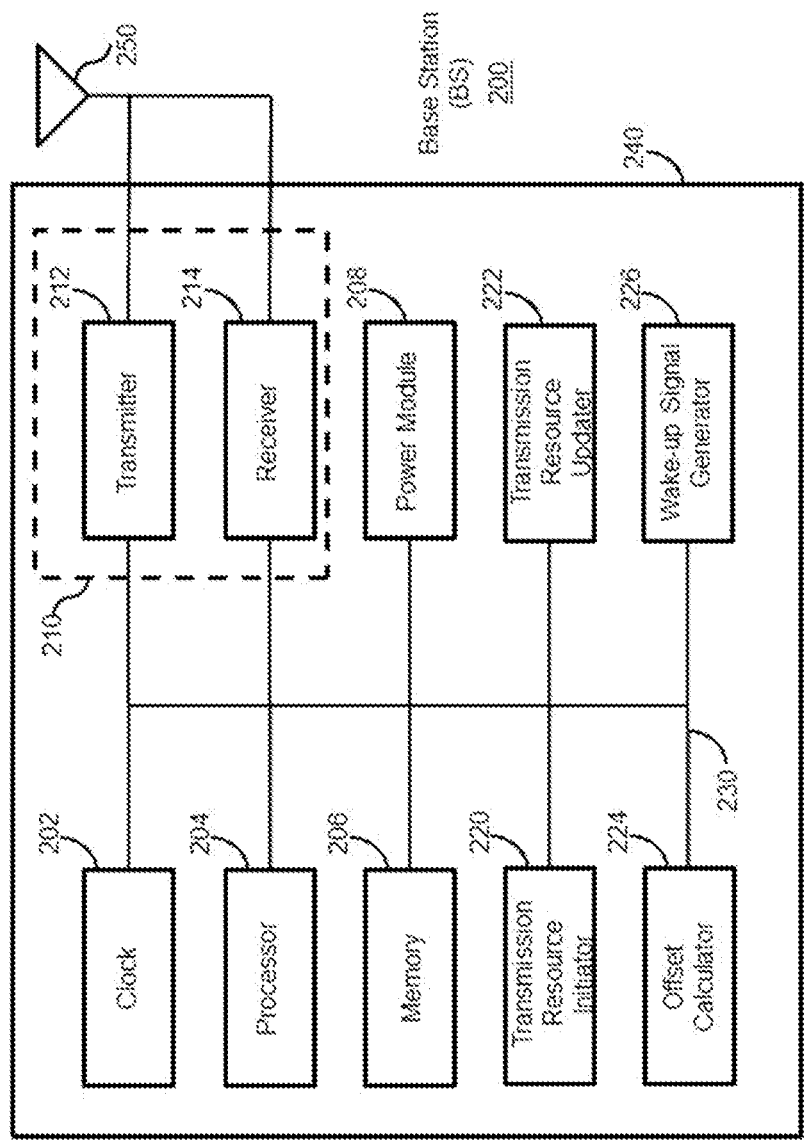
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, a transmission resource initiator 220, a transmission resource updater 222, an offset calculator 224, and a wake-up signal generator 226.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., the BS or another UE). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the BS 200 may start a paging process by sending to terminals or UEs a wake-up signal (WUS) to indicate one or more downlink control signals (e.g. PDCCH signals) associated with the wake up signal is to be transmitted to the UEs. But before sending the WUS, the BS determines a resource for WUS transmission.

In one embodiment, the transmission resource initiator 220 may determine an initial transmission resource for WUS transmission to a UE, e.g. by determining an initial index of the initial transmission resource. The initial transmission resource may be determined based on a predetermined setup or a transmission resource used for a previous WUS transmission.

The transmission resource updater 222 in this example can determine an updated transmission resource for WUS transmission based at least on the initial transmission resource and an offset. The offset may be selected from a plurality of predetermined values based on a location of a paging occasion (PO) corresponding to the WUS. In one embodiment, the transmission resource updater 222 may determine the updated transmission resource by determining an updated index of the updated transmission resource based on: the initial index, the offset, and a quantity of transmission resources in a resource set for WUS transmission corresponding to a location gap between the WUS and the corresponding paging occasion (PO). In one example, the quantity is one, and the resource set includes a single transmission resource that is different from a legacy transmission resource.

The offset calculator 224 in this example may calculate the offset and send the calculated offset value to the transmission resource updater 222 for transmission resource determination. In one embodiment, the offset calculator 224 may determine an initial value for a pseudo random sequence; generate the pseudo random sequence based on the initial value; select a portion from the pseudo random sequence; and calculate the offset based on the selected portion. In another embodiment, the transmission resource updater 222 may perform one or more of the following operations: determining an initial value for a pseudo random sequence; generating the pseudo random sequence based on the initial value; and selecting a portion from the pseudo random sequence.

In one embodiment, the initial value is determined based on at least one of: an identity (ID) of a cell where the UE is located; a current value of a discontinuous reception (DRX) cycle specific to the cell; a maximum value of the cell-specific DRX cycle; a minimum value of the cell-specific DRX cycle; a maximum value of a UE-specific DRX cycle; and a minimum value of the UE-specific DRX cycle. In another embodiment, the initial value is determined based on at least one of: a SFN of the PO corresponding to the WUS; an H-SFN of the PO corresponding to the WUS; a sub-frame number of the PO corresponding to the WUS; an ID of a cell where the UE is located; a cell-specific DRX cycle; and a UE-specific DRX cycle.

The portion may be selected based on at least one of: a system frame number (SFN) of the PO corresponding to the WUS; a Hyper-SFN (H-SFN) of the PO corresponding to the WUS; a sub-frame number of the PO corresponding to the WUS; an ID of a cell where the UE is located; a cell-specific DRX cycle; and a UE-specific DRX cycle. The offset calculator 224 may calculate the offset based on at least one of: a SFN of the PO corresponding to the WUS; an H-SFN of the PO corresponding to the WUS; a sub-frame number of the PO corresponding to the WUS; an ID of a cell where the UE is located; a current value of a cell-specific DRX cycle; a maximum value of the cell-specific DRX cycle; a minimum value of the cell-specific DRX cycle; a maximum value of a UE-specific DRX cycle; a minimum value of the UE-specific DRX cycle; and at least one pre-determined integer. The offset calculation may include operations of at least one of: a modulo operation, a division operation, and a floor function.

In one embodiment, the offset is determined based on a SFN of the PO corresponding to the WUS. The offset changes by one as the SFN changes by T, which is a maximum value of a DRX cycle or a predetermined value. In addition, a value of the offset corresponding to a value of SFN in a current cycle of T is determined based on a value of the offset corresponding to a value of SFN in a previous cycle of T.

The wake-up signal generator 226 in this example may generate a WUS for the UE, and transmit, via the transmitter 212 on the updated transmission resource, the WUS to the UE. In one embodiment, the WUS is transmitted to a group of UEs associated with the BS 200.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the offset calculator 224. Conversely, each of the modules illustrated in FIG. 2 can be implemented using a plurality of separate components or elements.

Figure 3:
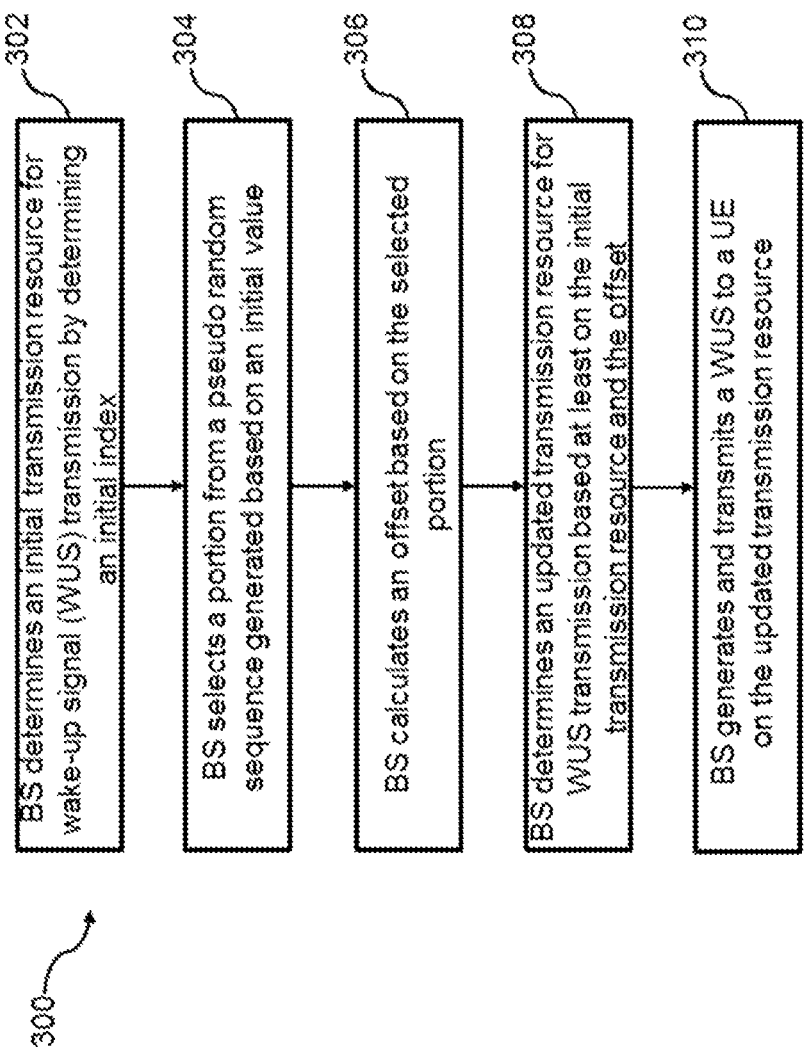
FIG. 3 illustrates a flow chart for a method performed by a BS for determining a transmission resource for transmitting a wake-up signal, in accordance with some embodiments of the present disclosure.

FIG. 3 illustrates a flow chart for a method 300 performed by a BS, e.g. the BS 200 in FIG. 2, for determining a transmission resource for transmitting a wake-up signal, in accordance with some embodiments of the present disclosure. At operation 302, the BS determines an initial transmission resource for WUS transmission by determining an initial index. At operation 304, the BS selects a portion from a pseudo random sequence generated based on an initial value. The BS calculates at operation 306 an offset based on the selected portion. At operation 308, the BS determines an updated transmission resource for WUS transmission based at least on the initial transmission resource and the offset. At operation 310, the BS generates and transmits a WUS to a UE on the updated transmission resource. According to various embodiments, the order of the operations shown in FIG. 3 may be changed.

Figure 4:
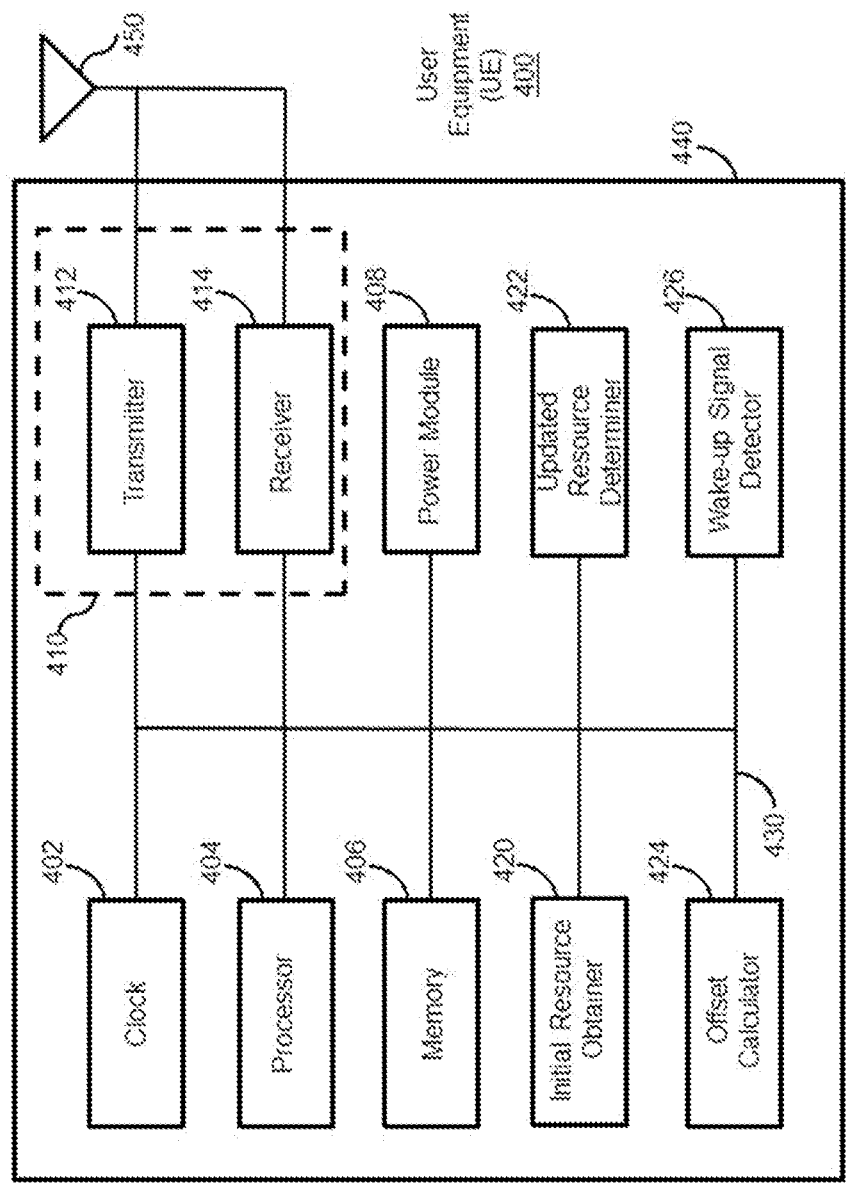
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, an initial resource obtainer 420, an updated resource determiner 422, an offset calculator 424, and a wake-up signal detector 426.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

In one embodiment, the initial resource obtainer 420 may obtain information about an initial transmission resource for detection of a WUS from a BS, e.g. by obtaining an initial index of the initial transmission resource based on a signaling from the BS or based on a group to which the UE belongs for WUS detection. The initial transmission resource may be determined based on a predetermined setup or a transmission resource used for a previous WUS transmission.

The updated resource determiner 422 in this example can determine an updated transmission resource for WUS detection based at least on the initial transmission resource and an offset. The offset may be selected from a plurality of predetermined values based on a location of a paging occasion (PO) corresponding to the WUS. In one embodiment, the updated resource determiner 422 may determine the updated transmission resource by determining an updated index of the updated transmission resource based on: the initial index, the offset, and a quantity of transmission resources in a resource set for WUS detection corresponding to a location gap between the WUS and the corresponding PO. In one example, the quantity is one, and the resource set includes a single transmission resource that is different from a legacy transmission resource.

The offset calculator 424 in this example may calculate the offset and send the calculated offset value to the updated resource determiner 422 for transmission resource determination. In one embodiment, the offset calculator 424 may determine an initial value for a pseudo random sequence; generate the pseudo random sequence based on the initial value; select a portion from the pseudo random sequence; and calculate the offset based on the selected portion. In another embodiment, the updated resource determiner 422 may perform one or more of the following operations: determining an initial value for a pseudo random sequence; generating the pseudo random sequence based on the initial value; and selecting a portion from the pseudo random sequence.

In one embodiment, the initial value is determined based on at least one of: an identity (ID) of a cell where the UE 400 is located; a current value of a discontinuous reception (DRX) cycle specific to the cell; a maximum value of the cell-specific DRX cycle; a minimum value of the cell-specific DRX cycle; a maximum value of a UE-specific DRX cycle; and a minimum value of the UE-specific DRX cycle. In another embodiment, the initial value is determined based on at least one of: a SFN of the PO corresponding to the WUS; an H-SFN of the PO corresponding to the WUS; a sub-frame number of the PO corresponding to the WUS; an ID of a cell where the UE 400 is located; a cell-specific DRX cycle; and a UE-specific DRX cycle.

The portion may be selected based on at least one of: a system frame number (SFN) of the PO corresponding to the WUS; a Hyper-SFN (H-SFN) of the PO corresponding to the WUS; a sub-frame number of the PO corresponding to the WUS; an ID of a cell where the UE 400 is located; a cell-specific DRX cycle; and a UE-specific DRX cycle. The offset calculator 424 may calculate the offset based on at least one of: a SFN of the PO corresponding to the WUS; an H-SFN of the PO corresponding to the WUS; a sub-frame number of the PO corresponding to the WUS; an ID of a cell where the UE 400 is located; a current value of a cell-specific DRX cycle; a maximum value of the cell-specific DRX cycle; a minimum value of the cell-specific DRX cycle; a maximum value of a UE-specific DRX cycle; a minimum value of the UE-specific DRX cycle; and at least one pre-determined integer. The offset calculation may include operations of at least one of: a modulo operation, a division operation, and a floor function.

In one embodiment, the offset is determined based on a SFN of the PO corresponding to the WUS. The offset changes by one as the SFN changes by T, which is a maximum value of a DRX cycle or a predetermined value. In addition, a value of the offset corresponding to a value of SFN in a current cycle of T is determined based on a value of the offset corresponding to a value of SFN in a previous cycle of T.

The wake-up signal detector 426 in this example may detect, via the receiver 414 on the updated transmission resource, a WUS transmitted from the BS. In one embodiment, the WUS is transmitted to a group of UEs including the UE 400.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the offset calculator 424. Conversely, each of the modules illustrated in FIG. 4 can be implemented using a plurality of separate components or elements.

Figure 5:
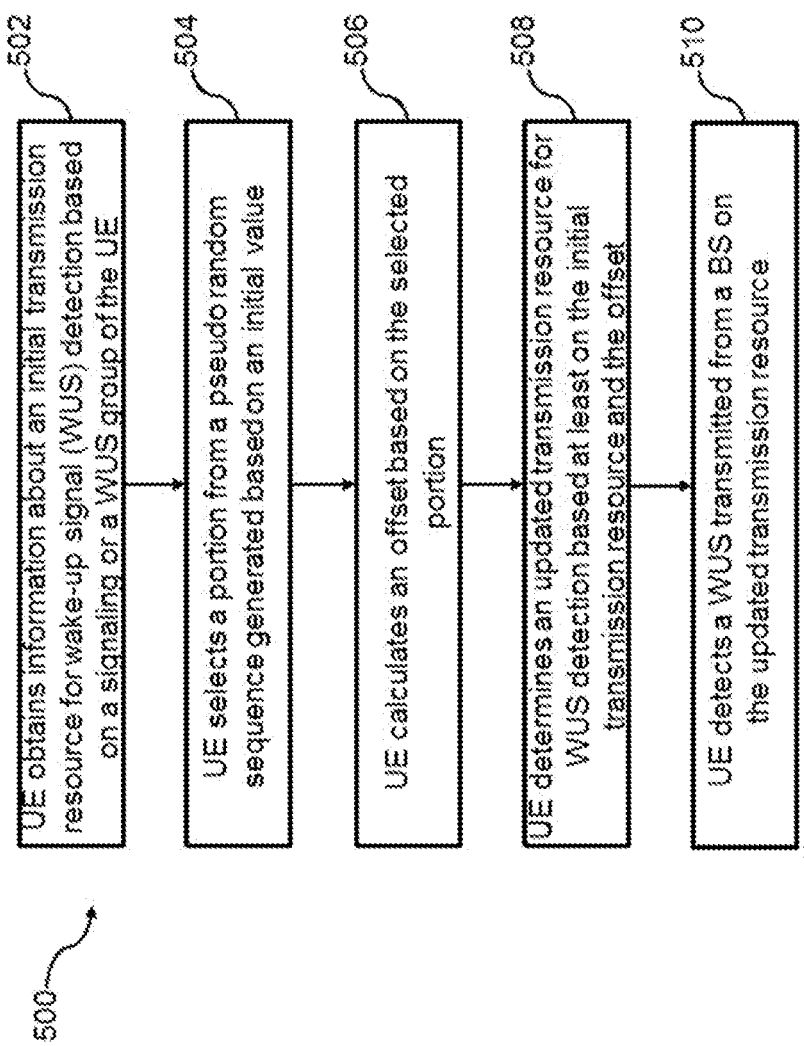
FIG. 5 illustrates a flow chart for a method performed by a UE for determining a transmission resource for detecting a wake-up signal, in accordance with some embodiments of the present disclosure.

FIG. 5 illustrates a flow chart for a method 500 performed by a UE, e.g. the UE 400 in FIG. 4, for determining a transmission resource for detecting a wake-up signal, in accordance with some embodiments of the present disclosure. At operation 502, the UE obtains information about an initial transmission resource for WUS detection based on a signaling or a WUS group of the UE. At operation 504, the UE selects a portion from a pseudo random sequence generated based on an initial value. The UE calculates at operation 506 an offset based on the selected portion. The UE determines at operation 508 an updated transmission resource for WUS detection based at least on the initial transmission resource and the offset. At operation 510, the UE determines whether to detect a single downlink control signal associated with the second signal based on each second signal. At operation 512, the UE detects a WUS transmitted from a BS on the updated transmission resource. According to various embodiments, the order of the operations shown in FIG. 5 may be changed.

Different embodiments of the present disclosure will now be described in detail hereinafter. It is noted that the features of the embodiments and examples in the present disclosure may be combined with each other in any manner without conflict.

According to various embodiments of the present disclosure, a method is provided for determining WUS resources for transmitting and receiving WUS in a wireless communication. In a first embodiment, before transmitting a wake-up signal (WUS), the base station (BS) determines an index of a WUS resource where the WUS is located or where the WUS is to be transmitted on. Based on the index, the BS transmits the WUS on the WUS resource corresponding to the index to a terminal. In one example, the BS determines the WUS resource index based on: an initial WUS resource index, an offset value, and a total number of configured WUS resources, e.g. based on the following equation:

$$WUS_{ID}^{resource} = \mathrm{mod}(WUS_{ID} + \mathrm{offset}, N^{resource})$$

where $WUS_{ID}$ is the initial WUS resource index corresponding to the WUS, being in the range of 0 to $N^{resource}-1$; $N^{resource}$ is the total number of configured WUS resources corresponding to a same gap, i.e. a location gap between the WUS and a PO corresponding to the WUS. At the next round of WUS resource index calculation, the initial WUS resource index of the next round may be determined based on the calculated or updated WUS resource index of the current round.

The value of the offset may be determined by:

$$\mathrm{offset} = \sum_{i=0}^{k} c(K*Y+i)*2^i$$

where k and K are positive integers pre-agreed by the BS and the terminal; c(n) is a random sequence or pseudo random sequence. The value of Y and/or the initial value of c(n) is determined based on at least one of the following factors: a system frame number (SFN) of the PO corresponding to the WUS; a Hyper-SFN (H-SFN) of the PO corresponding to the WUS; a sub-frame number of the PO corresponding to the WUS; an identity (ID) of a cell where the terminal is located; a discontinuous reception (DRX) cycle specific to the cell; and a DRX cycle specific to the terminal.

In various examples, Y1=(SFN+1024*H_SFN), or Y1=(10*SFN+floor(ns/2)), or Y1=(10240*H_SFN+10*SFN+floor(ns/2)); Y=Y1 or Y=Y1/T; and the initial value of c(n) is determined as: $c_{init}=T*2^9+N_{ID}^{cell}$ or $c_{init}=N_{ID}^{cell}$.

In the above equations, T may be: a current value of a cell-specific DRX cycle, a maximum value of a cell-specific DRX cycle, a minimum value of a cell-specific DRX cycle, a maximum value of a UE-specific DRX cycle, a positive integer pre-agreed by the BS and the terminal; or a minimum value of a UE-specific DRX cycle; SFN is an index of a system radio frame where the PO corresponding to the WUS is located; and the H-SFN is an index of a hyper frame where the PO corresponding to the WUS is located.

In a second embodiment, before transmitting a wake-up signal (WUS), the base station (BS) determines an index of a WUS resource where the WUS is located or where the WUS is to be transmitted on. Based on the index, the BS transmits the WUS on the WUS resource corresponding to the index to a terminal. In one example, the BS determines the WUS resource index based on: an initial WUS resource index, an offset value, and a total number of configured WUS resources, e.g. based on the following equation:

$$WUS_{ID}^{resource}=mod(WUS_{ID}+offset),N^{resource})$$

where $WUS_{ID}$ is the initial WUS resource index corresponding to the WUS, being in the range of 0 to $N^{resource}-1$; $N^{resource}$ is the total number of configured WUS resources corresponding to a same gap, i.e. a location gap between the WUS and a PO corresponding to the WUS. At the next round of WUS resource index calculation, the initial WUS resource index of the next round may be determined based on the calculated or updated WUS resource index of the current round.

The value of the offset may be determined by:

$$offset = \sum_{i=0}^{k} c(i)*2^i$$

where c(n) is a random sequence or pseudo random sequence. The initial value of c(n) is determined based on at least one of the following factors: a system frame number (SFN) of the PO corresponding to the WUS; a Hyper-SFN (H-SFN) of the PO corresponding to the WUS; a sub-frame number of the PO corresponding to the WUS; an ID of a cell where the terminal is located; a discontinuous reception (DRX) cycle specific to the cell; and a DRX cycle specific to the terminal.

In various examples, the initial value of c(n) is determined as: $c_{init}=N_{ID}^{cell}$, or $c_{init}=mod((SFN+1024*H\_SFN),T)*2^9+N_{ID}^{cell}$, or $c_{init}=mod((SFN+1024*H\_SFN)div\ T)*2^9+N_{ID}^{cell}$.

In the above equations, T may be: a current value of a cell-specific DRX cycle, a maximum value of a cell-specific DRX cycle, a minimum value of a cell-specific DRX cycle, a maximum value of a UE-specific DRX cycle, a positive integer pre-agreed by the BS and the terminal, or a minimum value of a UE-specific DRX cycle; SFN is an index of a system radio frame where the PO corresponding to the WUS is located; the H-SFN is an index of a hyper frame where the PO corresponding to the WUS is located; and div represents an operation of finding an integer quotient after division.

In a third embodiment, before transmitting a wake-up signal (WUS), the base station (BS) determines an index of a WUS resource where the WUS is located or where the WUS is to be transmitted on. Based on the index, the BS transmits the WUS on the WUS resource corresponding to the index to a terminal. In one example, the BS determines the WUS resource index based on: an initial WUS resource index, an offset value, and a total number of configured WUS resources, e.g. based on the following equation:

$$WUS_{ID}^{resource}=mod(WUS_{ID}+offset),N^{resource})$$

where $WUS_{ID}$ is the initial WUS resource index corresponding to the WUS, being in the range of 0 to $N^{resource}-1$; $N^{resource}$ is the total number of configured WUS resources corresponding to a same gap, i.e. a location gap between the WUS and a PO corresponding to the WUS. At the next round of WUS resource index calculation, the initial WUS resource index of the next round may be determined based on the calculated or updated WUS resource index of the current round.

The value of the offset may be determined by: offset=$m_1$*(SFN+1024*H_SFN)div($T_{DRXcycle}^{Cell}$)+$n_1$*(SFN+1024*H_SFN)div($T_1$)+$n_2$*(SFN+1024*H_SFN)div($T_2$) where $m_1$, $n_1$, $n_2$ are positive integers pre-agreed between the BS and the terminal; $T_{DRXcycle}^{Cell}$ is a current value of a cell-specific DRX cycle; $T_1$ may be a maximum value of a cell-based or UE-specific DRX cycle; $T_2$ may be a minimum value of a cell-based or UE-specific DRX cycle; div represents an operation of finding an integer quotient after division; SFN is an index of a system radio frame where the PO corresponding to the WUS is located; and the H-SFN is an index of a hyper frame where the PO corresponding to the WUS is located. In an MTC system, the value of $T_1$ is 256; and the value of $T_2$ is 32.

In a first example, it is assumed that the initial WUS resource index corresponding to a first WUS is 0, $m_1=1$, $n_1=1$, $n_2=1$, $T_{DRXcycle}^{Cell}=256$, $N^{resource}=4$, $WUS_{ID}=0$, $T_1=256$, $T_2=32$; and the radio frame numbers of the PO corresponding to the first WUS in order are: 1, 257, 513 .... Then the WUS resource index corresponding to the first WUS is determined based on: $WUS_{ID}^{resource}=mod((WUS_{ID}+offset),N^{resource})$, and offset=(SFN+1024*H_SFN)div(256)+(SFN+1024*H_SFN)div(256)+(SFN+1024*H_SFN)div(32). As such, the WUS resource indexes corresponding to the first WUS in order are: 0, 2, 0 ....

In a second example, it is assumed that the initial WUS resource index corresponding to a second WUS is 0, $m_1=1$, $n_1=1$, $n_2=1$, $T_{DRXcycle}^{Cell}=256$, $N^{resource}=4$, $WUS_{ID}=0$, $T_{1=256}$, $T_{2=32}$; and the radio frame numbers of the PO corresponding to the second WUS in order are: 1, 129, 257 .... Then the WUS resource index corresponding to the second WUS is determined based on: $WUS_{ID}^{resource}=mod(WUS_{ID}+offset),N^{resource})$, and offset=(SFN+1024*H_SFN)div(256)+(SFN+1024*H_SFN)div(256)+(SFN+1024*H_SFN)div(32). As such, the WUS resource indexes corresponding to the second WUS in order are: 0, 0, 2 ....

In a third example, it is assumed that the initial WUS resource index corresponding to a third WUS is 0, $m_1=1$, $n_1=1$, $n_2=1$, $T_{DRXcycle}^{Cell}=256$, $N^{resource}=4$, $WUS_{ID}=0$, $T_1=256$, $T_2=32$; and the radio frame numbers of the PO corresponding to the third WUS in order are: 1, 65, 129 . . . . Then the WUS resource index corresponding to the third WUS is determined based on: $WUS_{ID}^{resource}=mod(WUS_{ID}+offset),N^{resource})$, and offset=(SFN+1024*H_SFN)div(256)+(SFN+1024*H_SFN)div(256)+(SFN+1024*H_SFN)div(32). As such, the WUS resource indexes corresponding to the third WUS in order are: 0, 2, 0 . . . .

In a fourth example, it is assumed that the initial WUS resource index corresponding to a first WUS is 0, $m_1=1$, $n_1=1$, $n_2=1$, $T_{DRXcycle}^{Cell}=256$, $N^{resource}=4$, $WUS_{ID}=0$, $T_1=256$, $T_2=32$; and the radio frame numbers of the PO corresponding to the fourth WUS in order are: 1, 33, 65, 97 . . . . Then the WUS resource index corresponding to the fourth WUS is determined based on: $WUS_{ID}^{resource}=mod(WUS_{ID}+offset),N^{resource})$, and offset=(SFN+1024*H_SFN)div(256)+(SFN+1024*H_SFN)div(256)+(SFN+1024*H_SFN)div(32). As such, the WUS resource indexes corresponding to the fourth WUS in order are: 0, 1, 2, 3 . . . . The first to fourth WUS signals may correspond to a same UE or different UEs.

In a fourth embodiment, before transmitting a wake-up signal (WUS), the base station (BS) determines an index of a WUS resource where the WUS is located or where the WUS is to be transmitted on. Based on the index, the BS transmits the WUS on the WUS resource corresponding to the index to a terminal. In one example, the BS determines the WUS resource index based on: an initial WUS resource index, an offset value, and a total number of configured WUS resources, e.g. based on the following equation:

$$WUS_{ID}^{resource}=mod(WUS_{ID}+offset),N^{resource})$$

where $WUS_{ID}$ is the initial WUS resource index corresponding to the WUS, being in the range of 0 to $N^{resource}-1$; $N^{resource}$ is the total number of configured WUS resources corresponding to a same gap, i.e. a location gap between the WUS and a PO corresponding to the WUS. At the next round of WUS resource index calculation, the initial WUS resource index of the next round may be determined based on the calculated or updated WUS resource index of the current round.

The value of the offset may be determined by: offset=$n_1$*(SFN+1024*H_SFN)div($T_1$)+$n_2$*(SFN+1024*H SFN)div($T_2$) where $n_1$, m are positive integers pre-agreed between the BS and the terminal; $T_{DRXcycle}^{Cell}$ is a current value of a cell-specific DRX cycle; $T_1$ may be a maximum value of a cell-based or UE-specific DRX cycle; $T_2$ may be a minimum value of a cell-based or UE-specific DRX cycle; div represents an operation of finding an integer quotient after division; SFN is an index of a system radio frame where the PO corresponding to the WUS is located; and the H-SFN is an index of a hyper frame where the PO corresponding to the WUS is located. In an MTC system, the value of $T_1$ is 256; and the value of $T_2$ is 32.

In a first example, it is assumed that the initial WUS resource index corresponding to a first WUS is 0, $n_1=1$, $n_2=1$, $N^{resource}=4$, $WUS_{ID}=0$, $T_1=256$, $T_2=32$; and the radio frame numbers of the PO corresponding to the first WUS in order are: 1, 257, 513 . . . . Then the WUS resource index corresponding to the first WUS is determined based on: $WUS_{ID}^{resource}=mod(WUS_{ID}+offset),N^{resource})$, and offset=(SFN+1024*H_SFN)div(256)+(SFN+1024*H_SFN)div(32). As such, the WUS resource indexes corresponding to the first WUS in order are: 0, 1, 2 . . . .

In a second example, it is assumed that the initial WUS resource index corresponding to a second WUS is 0, $n_1=1$, $n_2=1$, $N^{resource}=4$, $WUS_{ID}=0$, $T_1=256$, $T_2=32$; and the radio frame numbers of the PO corresponding to the second WUS in order are: 1, 129, 257 . . . . Then the WUS resource index corresponding to the second WUS is determined based on: $WUS_{ID}^{resource}=mod(WUS_{ID}+offset),N^{resource})$, and offset=(SFN+1024*H_SFN)div(256)+(SFN+1024*H_SFN)div(32). As such, the WUS resource indexes corresponding to the second WUS in order are: 0, 0, 1 . . . .

In a third example, it is assumed that the initial WUS resource index corresponding to resource a third WUS is 0, $n_1=1$, $n_2=1$, $N^{resource}=4$, $WUS_{ID}=0$, $T_1=256$, $T_{2=32}$; and the radio frame numbers of the PO corresponding to the third WUS in order are: 1, 65, 129 . . . .

Then the WUS resource index corresponding to the third WUS is determined based on: $WUS_{ID}^{resource}=mod(WUS_{ID}+offset),N^{resource})$, and offset=(SFN+1024*H_SFN)div(256)+(SFN+1024*H_SFN)div(32). As such, the WUS resource indexes corresponding to the third WUS in order are: 0, 2, 0 . . . .

In a fourth example, it is assumed that the initial WUS resource index corresponding resource to a fourth WUS is 0, $n_1=1$, $n_2=1$, $N^{resource}=4$, $WUS_{ID}=0$, $T_1=256$, $T_2=32$; and the radio frame numbers of the PO corresponding to the fourth WUS in order are: 1, 33, 65, 97 . . . . Then the WUS resource index corresponding to the fourth WUS is determined based on: $WUS_{ID}^{resource}=mod(WUS_{ID}+offset),N^{resource})$, and offset=(SFN+1024*H_SFN)div(256)+(SFN+1024*H_SFN)div(32). As such, the WUS resource indexes corresponding to the fourth WUS in order are: 0, 1, 0, 1 . . . . The first to fourth WUS signals may correspond to a same UE or different UEs.

In a fifth embodiment, before transmitting a wake-up signal (WUS), the base station (BS) determines an index of a WUS resource where the WUS is located or where the WUS is to be transmitted on. Based on the index, the BS transmits the WUS on the WUS resource corresponding to the index to a terminal. In one example, the BS determines the WUS resource index based on: an initial WUS resource index, an offset value, and a total number of configured WUS resources, e.g. based on the following equation:

$$WUS_{ID}^{resource}=mod(WUS_{ID}+offset),N^{resource}),$$

where $WUS_{ID}$ is the initial WUS resource index corresponding to the WUS, being in the range of 0 to $N^{resource}-1$; $N^{resource}$ is the total number of configured WUS resources corresponding to a same gap, i.e. a location gap between the WUS and a PO corresponding to the WUS. At the next round of WUS resource index calculation, the initial WUS resource index of the next round may be determined based on the calculated or updated WUS resource index of the current round.

The value of the offset may be determined by: offset=$K_L$+$n_1$*(SFN+1024*H_SFN)div($T_1$) where $n_1$ is a positive integer pre-agreed between the BS and the terminal; $T_1$ may be a maximum value of a cell-based or UE-specific DRX cycle; div represents an operation of finding an integer quotient after division; SFN is an index of a system radio frame where the PO corresponding to the WUS is located; and the H-SFN is an index of a hyper frame where the PO corresponding to the WUS is located. In an MTC system, the value of $T_1$ is 256. The values of $K_L$ are shown in the following table, where the value of L is determined based on: L=mod(floor((SFN+1024*H_SFN)/32),8). The values in the table are just for an example, and the values of number of resources (M) does not exclude other values.

| Number of resources | $K_L$ |
|---|---|
| 4 | 02132130 |
| 3 | 02102102 |
| 2 | 01101001 |

In a first example, it is assumed that the initial WUS resource index corresponding to a first WUS is 0, $n_1=1$, $N^{resource}=4$, $WUS_{ID}=0$, $T_1=256$, and the radio frame numbers of the PO corresponding to the first WUS in order are: 1, 257, 513, 769 . . . . Then the WUS resource index corresponding to the first WUS is determined based on: $WUS_{ID}^{resource}=\text{mod}((WUS_{ID}+\text{offset}),N^{resource})$, $\text{offset}=K_l+(SFN+1024*H\_SFN)\text{div}(256)$ and $l=\text{mod}((SFN+1024*H\_SFN)\text{div }32,8)$. As such, the WUS resource indexes corresponding to the first WUS in order are: $\text{mod}(K_0,4)$, $\text{mod}(K_0+1,4)$, $\text{mod}(K_0+2,4)$, $\text{mod}(K_0+3,4)$ . . . where $K_0=0$. Then the WUS resource indexes corresponding to the first WUS in order are: 0, 1, 2, 3, . . . .

In a second example, it is assumed that the initial WUS resource index corresponding to a second WUS is 0, $n_1=1$, $N^{resource}=4$, $WUS_{ID}=0$, $T_1=256$, and the radio frame numbers of the PO corresponding to the second WUS in order are: 1, 129, 257, 385 . . . . Then the WUS resource index corresponding to the second WUS is determined based on: $WUS_{ID}^{resource}=\text{mod}((WUS_{ID}+\text{offset}), N^{resource})$, $\text{offset}=K_l+(SFN+1024*H\_SFN)\text{div}(256)$, and $l=\text{mod}((SFN+1024*H\_SFN)\text{div }32,8)$. As such, the WUS resource indexes corresponding to the second WUS in order are: $\text{mod}(K_0,4)$, $\text{mod}(K_4,4)$, $\text{mod}(K_0+1,4)$, $\text{mod}(K_4+1,4)$ . . . where $K_0=0$, $K_4=2$. Then the WUS resource indexes corresponding to the second WUS in order are: 0, 2, 1, 3, . . . .

In a third example, it is assumed that the initial WUS resource index corresponding to a third WUS is 0, $n_1=1$, $N^{resource}=4$, $WUS_{ID}=0$, $T_1=256$, and the radio frame numbers of the PO corresponding to the third WUS in order are: 1, 65, 129, 193 . . . . Then the WUS resource index corresponding to the third WUS is determined based on: $WUS_{ID}^{resource}=\text{mod}((WUS_{ID}+\text{offset}), N^{resource})$, $\text{offset}=K_l+(SFN+1024*H\_SFN)\text{div }(256)$, and $l=\text{mod}((SFN+1024*H\_SFN)\text{div }32,8)$. As such, the WUS resource indexes corresponding to the third WUS in order are: $\text{mod}(K_0,4)$, $\text{mod}(K_2,4)$, $\text{mod}(K_4+1,4)$, $\text{mod}(K_6+1,4)$ . . . where $K_0=0$, $K_2=1$, $K_4=2$, $K_6=3$. Then the WUS resource indexes corresponding to the third WUS in order are: 0, 2, 1, 3, . . . .

In a fourth example, it is assumed that the initial WUS resource index corresponding to a third WUS is 0, $n_1=1$, $N^{resource}=4$, $WUS_{ID}=0$, $T_1=256$, and the radio frame numbers of the PO corresponding to the third WUS in order are: 1, 33, 65, 97 . . . . Then the WUS resource index corresponding to the third WUS is determined based on: $WUS_{ID}^{resource}=\text{mod}(WUS_{ID}+\text{offset}), N^{resource})$ $\text{offset}=K_l+(SFN+1024*H\_SFN)\text{div}(256)$, and $l=\text{mod}((SFN+1024*H\_SFN)\text{div }32,8)$. As such, the WUS resource indexes corresponding to the third WUS in order are: $\text{mod}(K_0,4)$, $\text{mod}(K_l,4)$, $\text{mod}(K_2,4)$, $\text{mod}(K_3,4)$ . . . where $K_0=0$, $K_l=2$, $K_2=1$, $K_3=3$. Then the WUS resource indexes corresponding to the third WUS in order are: 0, 2, 1, 3, . . . . The first to fourth WUS signals may correspond to a same UE or different UEs.

As shown in the above examples, the offset calculation in this manner can ensure that the group WUS of all terminals can be uniformly or approximately uniformly distributed on all available WUS resources. Any offset calculation formula that can enable the group WUS of all terminals to be uniformly or approximately uniformly distributed on all available WUS resources, is within the scope of the present disclosure.

In an alternative embodiment, before transmitting a wake-up signal (WUS), the base station (BS) determines an index of a WUS resource where the WUS is located or where the WUS is to be transmitted on. Based on the index, the BS transmits the WUS on the WUS resource corresponding to the index to a terminal. In one example, the BS determines the WUS resource index based on: an initial WUS resource index, an offset value, and a total number of configured WUS resources, e.g. based on the following equation:

$$WUS_{ID}^{resource}=\text{mod}((WUS_{ID}+\text{offset}),N^{resource})$$

where $WUS_{ID}$ is the initial WUS resource index corresponding to the WUS, being in the range of 0 to $N^{resource}-1$; $N^{resource}$ is the total number of configured WUS resources corresponding to a same gap, i.e. a location gap between the WUS and a PO corresponding to the WUS. At the next round of WUS resource index calculation, the initial WUS resource index of the next round may be determined based on the calculated or updated WUS resource index of the current round.

The value of the offset may be determined by: $\text{offset}=K_l+n_1*(SFN+1024*H\_SFN)\text{div}(256)$ where $n_1$ is a positive integer pre-agreed between the BS and the terminal; div represents an operation of finding an integer quotient after division; SFN is an index of a system radio frame where the PO corresponding to the WUS is located; and the H-SFN is an index of a hyper frame where the PO corresponding to the WUS is located. In an NB-IoT system, the values of $K_L$ are shown in the following table, where the value of L is determined based on: $L=\text{mod}(\text{floor}((SFN+1024*H\_SFN)/32),8)$. The values in the table are just for an example.

| Number of resources | $K_L$ |
|---|---|
| 2 | 01101001 |

In a sixth embodiment, before transmitting a wake-up signal (WUS), the base station (BS) determines an index of a WUS resource where the WUS is located or where the WUS is to be transmitted on. Based on the index, the BS transmits the WUS on the WUS resource corresponding to the index to a terminal. In one example, the BS determines the WUS resource index based on: an initial WUS resource index, an offset value, and a total number of configured WUS resources, e.g. based on the following equation:

$$WUS_{ID}^{resource}=\text{mod}((WUS_{ID}+\text{offset}),N^{resource})$$

where $WUS_{ID}$ is the initial WUS resource index corresponding to the WUS, being in the range of 0 to $N^{resource}-1$; $N^{resource}$ is the total number of configured WUS resources corresponding to a same gap, i.e. a location gap between the WUS and a PO corresponding to the WUS. At the next round of WUS resource index calculation, the initial WUS resource index of the next round may be determined based on the calculated or updated WUS resource index of the current round.

The value of the offset may be determined from a plurality of predetermined values, wherein the predetermined values satisfy at least one of the following rules: (a) the predetermined values change with a period of T, wherein the value of T is a maximum value of a DRX cycle or a predetermined value; and (b) the predetermined values in the current T period are determined according to predetermined values in the previous T period.

In a seventh embodiment, before detecting a wake-up signal (WUS), the terminal determines an index of a WUS resource where the WUS is located or where the WUS is to be detected on. Based on the index, the terminal detects the WUS transmitted by a BS on the WUS resource corresponding to the index. In one example, the terminal determines the WUS resource index based on: an initial WUS resource index, an offset value, and a total number of configured WUS resources, e.g. based on the following equation:

$$WUS_{ID}^{resource} = \mod((WUS_{ID} + \text{offset}), N^{resource})$$

where $WUS_{ID}$ is the initial WUS resource index corresponding to the WUS, being in the range of 0 to $N^{resource}-1$; $N^{resource}$ is the total number of configured WUS resources corresponding to a same gap, i.e. a location gap between the WUS and a PO corresponding to the WUS.

The terminal may obtain the initial WUS resource index based on a signaling or implicitly obtain the initial WUS resource index based on the corresponding group index of the terminal. The terminal may obtain the value of $N^{resource}$ based on a higher layer signaling.

The value of the offset may be determined by:

$$\text{offset} = \sum_{i=0}^{k} c(K*Y + i) * 2^i$$

where k and K are positive integers pre-agreed by the BS and the terminal; c(n) is a random sequence or pseudo random sequence. The value of Y and/or the initial value of c(n) is determined based on at least one of the following factors: a system frame number (SFN) of the PO corresponding to the WUS; a Hyper-SFN (H-SFN) of the PO corresponding to the WUS; a sub-frame number of the PO corresponding to the WUS; an identity (ID) of a cell where the terminal is located; a discontinuous reception (DRX) cycle specific to the cell; and a DRX cycle specific to the terminal.

In various examples, Y1=(SFN+1024*H_SFN), or Y1= (10*SFN+floor(ns/2)), or Y1=(10240*H_SFN+10*SFN+ floor(ns/2)); Y=Y1 or Y=Y1/T; and the initial value of c(n) is determined as: $c_{init} = T*2^9 + N_{ID}^{cell}$ or $c_{init} = N_{ID}^{cell}$.

In the above equations, T may be: a current value of a cell-specific DRX cycle, a maximum value of a cell-specific DRX cycle, a minimum value of a cell-specific DRX cycle, a maximum value of a UE-specific DRX cycle, a positive integer pre-agreed by the BS and the terminal, or a minimum value of a UE-specific DRX cycle; SFN is an index of a system radio frame where the PO corresponding to the WUS is located; and the H-SFN is an index of a hyper frame where the PO corresponding to the WUS is located.

In an eighth embodiment, before detecting a wake-up signal (WUS), the terminal determines an index of a WUS resource where the WUS is located or where the WUS is to be detected on. Based on the index, the terminal detects the WUS transmitted by a BS on the WUS resource corresponding to the index. In one example, the terminal determines the WUS resource index based on: an initial WUS resource index, an offset value, and a total number of configured WUS resources, e.g. based on the following equation:

$$WUS_{ID}^{resource} = \mod((WUS_{ID} + \text{offset}), N^{resource})$$

where $WUS_{ID}$ is the initial WUS resource index corresponding to the WUS, being in the range of 0 to $N^{resource}-1$; $N^{resource}$ is the total number of configured WUS resources corresponding to a same gap, i.e. a location gap between the WUS and a PO corresponding to the WUS.

The terminal may obtain the initial WUS resource index based on a signaling or implicitly obtain the initial WUS resource index based on the corresponding group index of the terminal. The terminal may obtain the value of $N^{resource}$ based on a higher layer signaling.

The value of the offset may be determined by:

$$\text{offset} = \sum_{i=0}^{k} c(i) * 2^i$$

where c(n) is a random sequence or pseudo random sequence. The initial value of c(n) is determined based on at least one of the following factors: a system frame number (SFN) of the PO corresponding to the WUS; a Hyper-SFN (H-SFN) of the PO corresponding to the WUS; a sub-frame number of the PO corresponding to the WUS; an ID of a cell where the terminal is located; a discontinuous reception (DRX) cycle specific to the cell; and a DRX cycle specific to the terminal.

In various examples, the initial value of c(n) is determined as: $c_{init} = N_{ID}^{cell}$, or $c_{init} = \mod((SFN+1024*H\_SFN), T)*2^9 + N_{ID}^{cell}$, or $c_{init} = \mod((SFN+1024*H\_SFN) \div T)*2^9 + N_{ID}^{cell}$.

In the above equations, T may be: a current value of a cell-specific DRX cycle, a maximum value of a cell-specific DRX cycle, a minimum value of a cell-specific DRX cycle, a maximum value of a UE-specific DRX cycle, a positive integer pre-agreed by the BS and the terminal, or a minimum value of a UE-specific DRX cycle; SFN is an index of a system radio frame where the PO corresponding to the WUS is located; the H-SFN is an index of a hyper frame where the PO corresponding to the WUS is located; and div represents an operation of finding an integer quotient after division.

In a ninth embodiment, before detecting a wake-up signal (WUS), the terminal determines an index of a WUS resource where the WUS is located or where the WUS is to be detected on. Based on the index, the terminal detects the WUS transmitted by a BS on the WUS resource corresponding to the index. In one example, the terminal determines the WUS resource index based on: an initial WUS resource index, an offset value, and a total number of configured WUS resources, e.g. based on the following equation:

$$WUS_{ID}^{resource} = \mod((WUS_{ID} + \text{offset}), N^{resource})$$

where $WUS_{ID}$ is the initial WUS resource index corresponding to the WUS, being in the range of 0 to $N^{resource}-1$; $N^{resource}$ is the total number of configured WUS resources corresponding to a same gap, i.e. a location gap between the WUS and a PO corresponding to the WUS.

The terminal may obtain the initial WUS resource index based on a signaling or implicitly obtain the initial WUS resource index based on the corresponding group index of the terminal. The terminal may obtain the value of $N^{resource}$ based on a higher layer signaling.

The value of the offset may be determined by: offset=$m_1$* (SFN+1024*H_SFN)div($T_{DRXcycle}^{Cell}$)+$n_1$*(SFN+ 1024*H_SFN)div($T_1$)+$n_2$*(SFN+1024*H_SFN)div($T_2$) where $m_1$, $n_1$, $n_2$ are positive integers pre-agreed between the BS and the terminal; $T_{DRXcycle}^{Cell}$ is a current value of a cell-specific DRX cycle; $T_1$ may be a maximum value of a cell-based or UE-specific DRX cycle; $T_2$ may be a minimum value of a cell-based or UE-specific DRX cycle; div represents an operation of finding an integer quotient after division; SFN is an index of a system radio frame where the PO corresponding to the WUS is located; and the H-SFN is an index of a hyper frame where the PO corresponding to the WUS is located. In an MTC system, the value of $T_1$ is 256; and the value of $T_2$ is 32.

In a first example, it is assumed that a terminal A determines that the corresponding resource initial WUS resource index is 0, $m_1=1$, $n_1=1$, $n_2=1$, $T_{DRXcycle}^{Cell}=256$ N=4 $WUS_{ID}=0$, $T_1=256$, $T_2=32$; and the radio frame numbers of the PO corresponding to the terminal A in order are: 1, 257, 513 . . . . Then the terminal A determines the WUS resource index corresponding to each PO based on: $WUS_{ID}^{resource}=\text{mod}((WUS_{ID}+\text{offset}), N^{resource})$, and offset= (SFN+1024*H_SFN)div(256)+(SFN+1024*H_SFN)div (256)+(SFN+1024*H_SFN)div(32). As such, the terminal A determines that the corresponding WUS resource indexes in order are: 0, 2, 0 . . . .

In a second example, it is assumed that a terminal A determines that the corresponding initial WUS resource index is 0, $m_1=1$, $n_1=1$, $n_2=1$, $T_{DRXcycle}^{Cell}=256$, $N^{resource}=4$, $WUS_{ID}=0$, $T_1=256$, $T_2=32$; and the radio frame numbers of the PO corresponding to the terminal A in order are: 1, 129, 257, . . . . Then the terminal A determines the WUS resource index corresponding to each PO based on: $WUS_{ID}^{resource}=\text{mod}((WUS_{ID}+\text{offset}), N^{resource})$, and offset= (SFN+1024*H_SFN)div(256)+(SFN+1024*H_SFN)div (256)+(SFN+1024*H_SFN)div(32). As such, the terminal A determines that the corresponding WUS resource indexes in order are: 0, 0, 2

In a third example, it is assumed that a terminal A determines that the corresponding initial WUS resource index is 0, $m_1=1$, $n_1=1$, $n_2=1$, $T_{DRXcycle}^{Cell}=256$, $N^{resource}=4$, $WUS_{ID}=0$, $T_1=256$, $T_2=32$; and the radio frame numbers of the PO corresponding to the terminal A in order are: 1, 65, 129, . . . . Then the terminal A determines the WUS resource index corresponding to each PO based on: $WUS_{ID}^{resource}=\text{mod}((WUS_{ID}+\text{offset}), N^{resource})$, and offset= (SFN+1024*H_SFN)div(256)+(SFN+1024*H_SFN)div (256)+(SFN+1024*H_SFN)div(32). As such, the terminal A determines that the corresponding WUS resource indexes in order are: 0, 2, 0 . . . .

In a fourth example, it is assumed that a terminal A determines that the corresponding resource initial WUS resource index is 0, $m_1=1$, $n_1=1$, $n_2=1$ $T_{DRXcycle}^{Cell}=256$, $N^{resource}=4$, $WUS_{ID}=0$, $T_1=256$, $T_2=32$; and the radio frame numbers of the PO corresponding to the terminal A in order are: 1, 33, 65, 97 . . . . Then the terminal A determines the WUS resource index corresponding to each PO based on: $WUS_{ID}^{resource}=\text{mod}((WUS_{ID}+\text{offset}), N^{resource})$, and offset= (SFN+1024*H_SFN)div(256)+(SFN+1024*H_SFN)div (256)+(SFN+1024*H_SFN)div(32). As such, the terminal A determines that the corresponding WUS resource indexes in order are: 0, 1, 2, 3 . . . .

In a tenth embodiment, before detecting a wake-up signal (WUS), the terminal determines an index of a WUS resource where the WUS is located or where the WUS is to be detected on. Based on the index, the terminal detects the WUS transmitted by a BS on the WUS resource corresponding to the index. In one example, the terminal determines the WUS resource index based on: an initial WUS resource index, an offset value, and a total number of configured WUS resources, e.g. based on the following equation:

$$WUS_{ID}^{resource}=\text{mod}((WUS_{ID}+\text{offset}), N^{resource})$$

where $WUS_{ID}$ is the initial WUS resource index corresponding to the WUS, being in the range of 0 to $N^{resource}-1$; $N^{resource}$ is the total number of configured WUS resources corresponding to a same gap, i.e. a location gap between the WUS and a PO corresponding to the WUS.

The terminal may obtain the initial WUS resource index based on a signaling or implicitly obtain the initial WUS resource index based on the corresponding group index of the terminal. The terminal may obtain the value of $N^{resource}$ based on a higher layer signaling.

The value of the offset may be determined by: offset=$n_1$* (SFN+1024*H_SFN)div($T_1$)+$n_2$*(SFN+1024*H_SFN)div ($T_2$) where $n_1$, $n_2$ are positive integers pre-agreed between the BS and the terminal; $T_{DRXcycle}^{Cell}$ is a current value of a cell-specific DRX cycle; $T_1$ may be a maximum value of a cell-based or UE-specific DRX cycle; $T_2$ may be a minimum value of a cell-based or UE-specific DRX cycle; div represents an operation of finding an integer quotient after division; SFN is an index of a system radio frame where the PO corresponding to the WUS is located; and the H-SFN is an index of a hyper frame where the PO corresponding to the WUS is located. In an MTC system, the value of $T_1$ is 256; and the value of $T_2$ is 32.

In a first example, it is assumed that a terminal A determines that the corresponding initial WUS resource index is 0, m=1, $n_1=1$, $n_2=1$, $N^{resource}=4$, $WUS_{ID}=0$, $T_1=256$, $T_2=32$; and the radio frame numbers of the PO corresponding to the terminal A in order are: 1, 257, 513 . . . . Then the terminal A determines the WUS resource index corresponding to each PO based on: $WUS_{ID}^{resource}=\text{mod}((WUS_{ID}+\text{offset}), N^{resource})$, and offset= (SFN+1024*H_SFN)div(256)+(SFN+1024*H_SFN)div (32). As such, the terminal A determines that the corresponding WUS resource indexes in order are: 0, 1, 2 . . . .

In a second example, it is assumed that a terminal A determines that the corresponding resource initial WUS resource index is 0, $n_1=1$, $n_2=1$, $N^{resource}=4$, $WUS_{ID}=0$, $T_1=256$, $T_2=32$; and the radio frame numbers of the PO corresponding to the terminal A in order are: 1, 129, 257 . . . . Then the terminal A determines the WUS resource index corresponding to each PO based on: $WUS_{ID}^{resource}=\text{mod}((WUS_{ID}+\text{offset}), N^{resource})$, and offset= (SFN+1024*H_SFN)div(256)+(SFN+1024*H_SFN)div (32). As such, the terminal A determines that the corresponding WUS resource indexes in order are: 0, 0, 1 . . . .

In a third example, it is assumed that a terminal A determines that the corresponding resource initial WUS resource index is 0, $n_1=1$, $n_2=1$, $N^{resource}=4$, $WUS_{ID}=0$, $T_1=256$, $T_2=32$; and the radio frame numbers of the PO corresponding to the terminal A in order are: 1, 65, 129 . . . . Then the terminal A determines the WUS resource index corresponding to each PO based on: $WUS_{ID}^{resource}=\text{mod}((WUS_{ID}+\text{offset}), N^{resource})$, and offset= (SFN+1024*H_SFN)div(256)+(SFN+1024*H_SFN)div (32). As such, the terminal A determines that the corresponding WUS resource indexes in order are: 0, 2, 0 . . . .

In a fourth example, it is assumed that a terminal A determines that the corresponding resource initial WUS resource index is 0, $n_1=1$, $n_2=1$, $N^{resource}=4$, $WUS_{ID}=0$, $T_1=256$, $T_2=32$; and the radio frame numbers of the PO corresponding to the terminal A in order are: 1, 33, 65, 97 . . . . Then the terminal A determines the WUS resource index corresponding to each PO based on: $WUS_{ID}^{resource}=\text{mod}((WUS_{ID}+\text{offset}), N^{resource})$, and offset= (SFN+1024*H_SFN)div(256)+(SFN+1024*H_SFN)div (32). As such, the terminal A determines that the corresponding WUS resource indexes in order are: 0, 1, 0, 1 . . . .

In an eleventh embodiment, before detecting a wake-up signal (WUS), the terminal determines an index of a WUS resource where the WUS is located or where the WUS is to be detected on. Based on the index, the terminal detects the WUS transmitted by a BS on the WUS resource corresponding to the index. In one example, the terminal determines the WUS resource index based on: an initial WUS resource index, an offset value, and a total number of configured WUS resources, e.g. based on the following equation:

$$WUS_{ID}^{resource}=mod((WUS_{ID}+\text{offset}),N^{resource})$$

where $WUS_{ID}$ is the initial WUS resource index corresponding to the WUS, being in the range of 0 to $N^{resource}-1$; $N^{resource}$ is the total number of configured WUS resources corresponding to a same gap, i.e. a location gap between the WUS and a PO corresponding to the WUS. The terminal may obtain the initial WUS resource index based on a signaling or implicitly obtain the initial WUS resource index based on the corresponding group index of the terminal. The terminal may obtain the value of $N^{resource}$ based on a higher layer signaling.

The value of the offset may be determined by: offset=$K_I$+$n_1$*(SFN+1024*H_SFN)div($T_1$) where $n_1$ is a positive integer pre-agreed between the BS and the terminal; $T_1$ may be a maximum value of a cell-based or UE-specific DRX cycle; div represents an operation of finding an integer quotient after division; SFN is an index of a system radio frame where the PO corresponding to the WUS is located; and the H-SFN is an index of a hyper frame where the PO corresponding to the WUS is located. In an MTC system, the value of $T_1$ is 256. The values of $K_L$ are shown in the following table, where the value of L is determined based on: L=mod(floor((SFN+1024*H_SFN)/32),8). The values in the table are just for an example, and the values of number of resources (M) does not exclude other values.

| Number of resources | $K_L$ |
|---|---|
| 4 | 02132130 |
| 3 | 02102102 |
| 2 | 01101001 |

In a first example, it is assumed that a terminal A determines that the corresponding resource initial WUS resource index is 0, $n_1$=1, $N^{resource}$=4, $WUS_{ID}$=0, $T_1$=256, and the radio frame numbers of the PO corresponding to the terminal A in order are: 1, 257, 513, 769 . . . . Then the terminal A determines the WUS resource index corresponding to each PO based on: $WUS_{ID}^{resource}$=mod(($WUS_{ID}$+offset), $N^{resource}$), offset=$K_I$+(SFN+1024*H_SFN)div(256), and l=mod((SFN+1024*H_SFN)div 32,8). As such, the terminal A determines that the corresponding WUS resource indexes in order are: mod($K_0$,4), mod($K_0$+1,4), mod($K_0$+2,4), mod($K_0$+3,4) where $K_0$=0. Then the corresponding WUS resource indexes in order are: 0, 1, 2, 3, . . . .

In a second example, it is assumed that a terminal A determines that the corresponding initial WUS resource index is 0, $n_1$=1, $N^{resource}$=4, $WUS_{ID}$=0, $T_1$=256, and the radio frame numbers of the PO corresponding to the terminal A in order are: 1, 129, 257, 385 . . . . Then the terminal A determines the WUS resource index corresponding to each PO based on: $WUS_{ID}^{resource}$=mod(($WUS_{ID}$+offset), $N^{resource}$), offset=$K_I$+(SFN+1024*H_SFN)div (256), and l=mod((SFN+1024*H_SFN)div 32,8). As such, the terminal A determines that the corresponding WUS resource indexes in order are: mod($K_0$,4), mod($K_4$,4), mod($K_0$+1,4), mod ($K_4$+1,4) where $K_0$=0, $K_4$=2. Then the corresponding WUS resource indexes in order are: 0, 2, 1, 3, . . . .

In a third example, it is assumed that a terminal A determines that the corresponding initial WUS resource index is 0, $n_1$=1, $N^{resource}$=4, $WUS_{ID}$=0, $T_1$=256, and the radio frame numbers of the PO corresponding to the terminal A in order are: 1, 65, 129, 193 . . . . Then the terminal A determines the WUS resource index corresponding to each PO based on: $WUS_{ID}^{resource}$=mod(($WUS_{ID}$+offset), $N^{resource}$), offset=$K_I$+(SFN+1024*H_SFN)div(256), and l=mod((SFN+1024*H_SFN)div 32,8). As such, the terminal A determines that the corresponding WUS resource indexes in order are: mod($K_0$,4), mod($K_2$,4), mod($K_4$+1,4), mod ($K_6$+1,4) where $K_0$=0, $K_2$=1, $K_4$=2, $K_6$=3. Then the corresponding WUS resource indexes in order are: 0, 2, 1, 3, . . . .

In a fourth example, it is assumed that a terminal A determines that the corresponding resource initial WUS resource index is 0, $n_1$=1, $N^{resource}$=4, $WUS_{ID}$=0, $T_1$=256, and the radio frame numbers of the PO corresponding to the terminal A in order are: 1, 33, 65, 97 . . . . Then the terminal A determines the WUS resource index corresponding to each PO based on: $WUS_{ID}^{resource}$=mod(($WUS_{ID}$+offset), $N^{resource}$), offset=$K_I$+(SFN+1024*H_SFN)div (256), and l=mod((SFN+1024*H_SFN)div 32,8). As such, the terminal A determines that the corresponding WUS resource indexes in order are: mod($K_0$,4), mod($K_I$,4), mod($K_2$,4), mod($K_3$,4) where $K_0$=0, $K_I$=2, $K_2$=1, $K_3$=3. Then the corresponding WUS resource indexes in order are: 0, 2, 1, 3, . . . .

In an alternative embodiment, before detecting a wake-up signal (WUS), the terminal determines an index of a WUS resource where the WUS is located or where the WUS is to be detected on. Based on the index, the terminal detects the WUS transmitted by a BS on the WUS resource corresponding to the index. In one example, the terminal determines the WUS resource index based on: an initial WUS resource index, an offset value, and a total number of configured WUS resources, e.g. based on the following equation:

$$WUS_{ID}^{resource}=mod((WUS_{ID}+\text{offset}),N^{resource})$$

where $WUS_{ID}$ is the initial WUS resource index corresponding to the WUS, being in the range of 0 to $N^{resource}-1$; $N^{resource}$ is the total number of configured WUS resources corresponding to a same gap, i.e. a location gap between the WUS and a PO corresponding to the WUS. The terminal may obtain the initial WUS resource index based on a signaling or implicitly obtain the initial WUS resource index based on the corresponding group index of the terminal. The terminal may obtain the value of $N^{resource}$ based on a higher layer signaling.

The value of the offset may be determined by: offset=$K_I$+$n_1$*(SFN+1024*H_SFN)div(256) where $n_1$ is a positive integer pre-agreed between the BS and the terminal; div represents an operation of finding an integer quotient after division; SFN is an index of a system radio frame where the PO corresponding to the WUS is located; and the H-SFN is an index of a hyper frame where the PO corresponding to the WUS is located. In an NB-IoT system, the values of $K_L$ are shown in the following table, where the value of L is determined based on: L=mod(floor((SFN+1024*H_SFN)/32),8). The values in the table are just for an example.

| Number of resources | $K_L$ |
|---|---|
| 2 | 01101001 |

In a twelfth embodiment, before detecting a wake-up signal (WUS), the terminal determines an index of a WUS resource where the WUS is located or where the WUS is to be detected on. Based on the index, the terminal detects the WUS transmitted by a BS on the WUS resource corresponding to the index. In one example, the terminal determines the WUS resource index based on: an initial WUS resource index, an offset value, and a total number of configured WUS resources, e.g. based on the following equation:

$$WUS_{ID}^{resource} = \mod((WUS_{ID}+\text{offset}), N^{resource})$$

where $WUS_{ID}$ is the initial WUS resource index corresponding to the WUS, being in the range of 0 to $N^{resource}-1$; $N^{resource}$ is the total number of configured WUS resources corresponding to a same gap, i.e. a location gap between the WUS and a PO corresponding to the WUS.

The terminal may obtain the initial WUS resource index based on a signaling or implicitly obtain the initial WUS resource index based on the corresponding group index of the terminal. The terminal may obtain the value of $N^{resource}$ based on a higher layer signaling.

The value of the offset may be determined from a plurality of predetermined values, wherein the predetermined values satisfy at least one of the following rules: (a) the predetermined values change with a period of T, wherein the value of T is a maximum value of a DRX cycle or a predetermined value; and (b) the predetermined values in the current T period are determined according to predetermined values in the previous T period.

Figure 6:
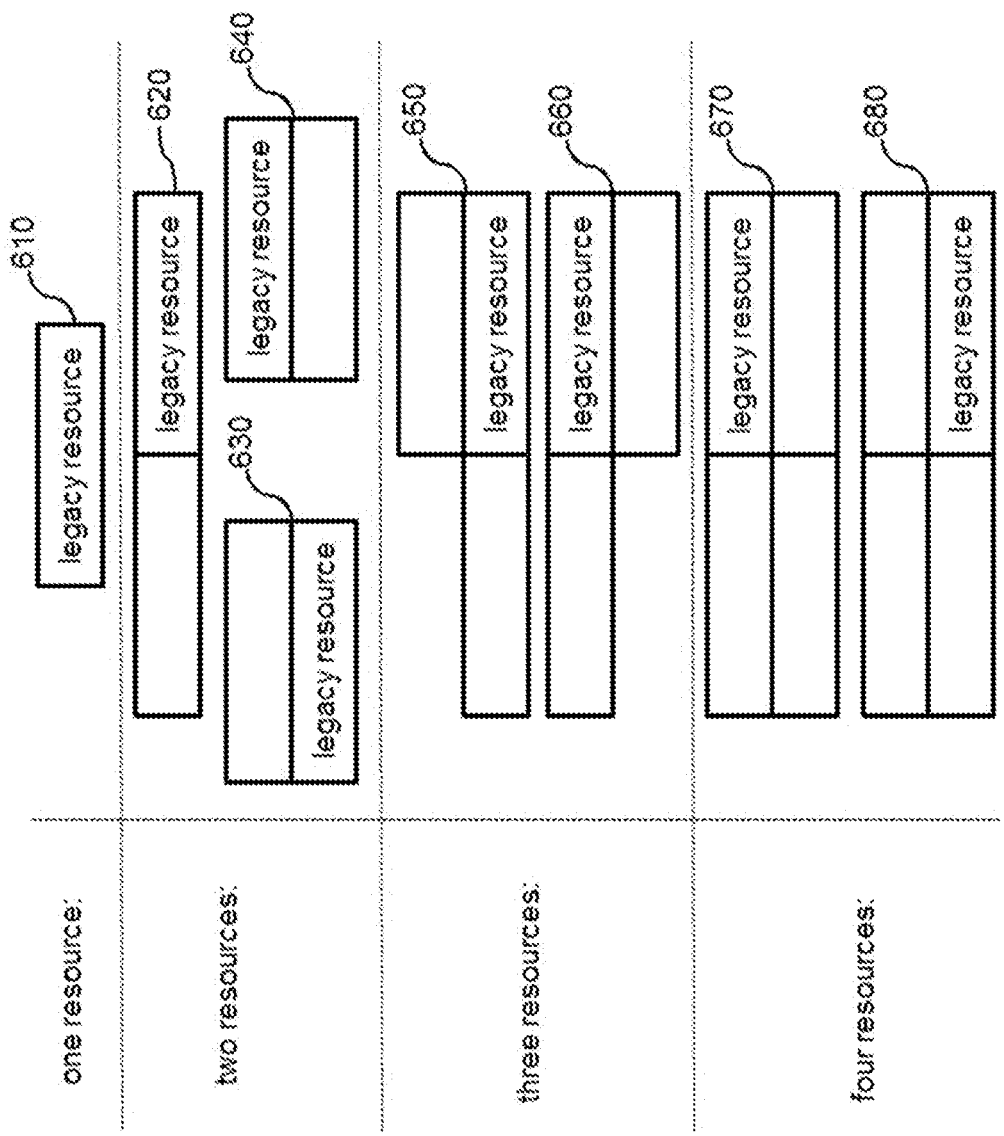
FIG. 6 illustrates an exemplary set of WUS resource configurations, in accordance with an embodiment of the present disclosure.

In a thirteenth embodiment, the maximum number (N) of WUS resources corresponding to one gap is 4, for an MTC system. In this embodiment, there are eight supported WUS resource configurations. FIG. 6 illustrates an example of these eight WUS resource configurations, in accordance with an embodiment of the present disclosure. As shown in FIG. 6, the legacy resource 610, e.g. a legacy MTC WUS resource, corresponds to the situation when the number N of WUS resources corresponding to one gap is one. When the number N of WUS resources corresponding to one gap is two, there are three kinds of WUS resource configurations 620, 630, 640. Two kinds of WUS resource configurations 650, 660 correspond to a situation when the number N of WUS resources corresponding to one gap is three. Two kinds of WUS resource configurations 670, 680 correspond to a situation when the number N of WUS resources corresponding to one gap is four.

In one example, the legacy WUS resource corresponds to a WUS resource index of 0. The WUS resource indexes corresponding to other WUS resources may be numbered according to an order following: either (a) first frequency domain, then time domain; or (b) first time domain, then frequency domain.

Figure 7:
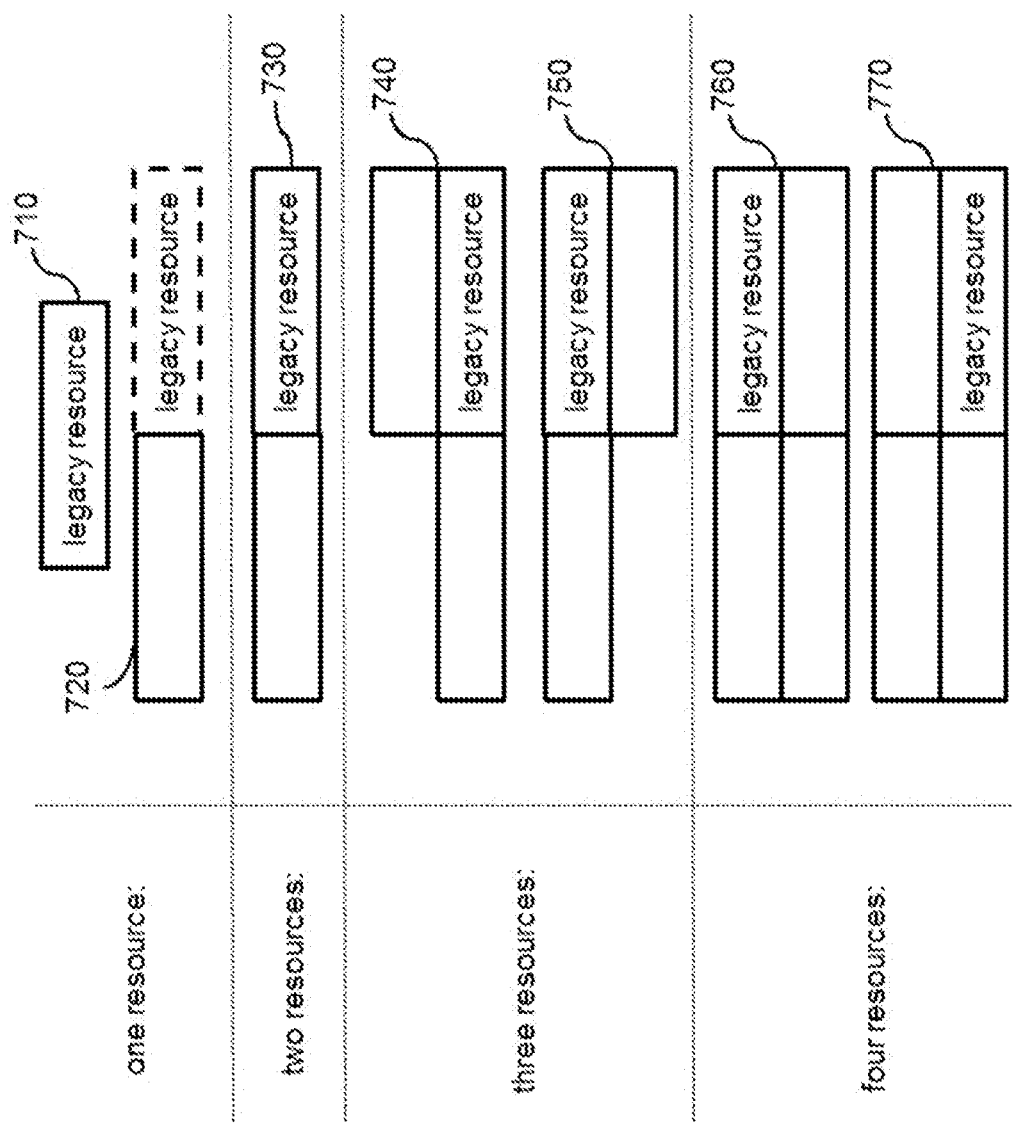
FIG. 7 illustrates another exemplary set of WUS resource configurations, in accordance with an embodiment of the present disclosure.

In a fourteenth embodiment, the maximum number (N) of WUS resources corresponding to one gap is 4, for an MTC system. In this embodiment, there are seven supported WUS resource configurations. FIG. 7 illustrates an example of these seven WUS resource configurations, in accordance with an embodiment of the present disclosure. As shown in FIG. 7, two kinds of WUS resource configurations 710, 720 correspond to a situation when the number N of WUS resources corresponding to one gap is one; one WUS resource configuration 730 corresponds to a situation when the number N of WUS resources corresponding to one gap is two; two kinds of WUS resource configurations 740, 750 correspond to a situation when the number N of WUS resources corresponding to one gap is three; and two kinds of WUS resource configurations 760, 770 correspond to a situation when the number N of WUS resources corresponding to one gap is four. In one example, the legacy WUS resource corresponds to a WUS resource index of 0. The WUS resource indexes corresponding to other WUS resources may be numbered according to an order following: either (a) first frequency domain, then time domain; or (b) first time domain, then frequency domain.

In a fifteenth embodiment, a base station (BS) determines a PO that includes a narrowband reference signal (NRS), and transmits the NRS in a sub-frame corresponding to the PO. The BS determines the PO according to a value of R, where:

$$R=(\text{PO\_Index}+\text{offset})\mod 2;$$

$$\text{PO\_Index}=(SFN/T*nB+i\_s)\mod nB.$$

When the value of R is 1, the PO corresponding to the PO_index is a PO including the NRS. The value of the offset is determined based on:

$$\text{offset} = \sum_{i=0}^{k} c(K*n+i)*2^i,$$

wherein, $n=SFN+1024*H\_SFN$, $c_{init}=N_{ID}^{cell}$, or $n=0$, $c_{init}=\mod((SFN+1024*H\_SFN)\text{div } T)*2^9+N_{ID}^{cell}$.
where nB, i-s, T are values configured by signaling; SFN is an index of a system radio frame where the PO is located; the H-SFN is an index of a hyper frame where the PO is located; k and K are values pre-agreed by the BS and the terminal; and $N_{ID}^{cell}$ is the cell index. T may be: a current value of a cell-specific DRX cycle, a maximum value of a cell-specific DRX cycle, a minimum value of a cell-specific DRX cycle, a maximum value of a UE-specific DRX cycle, a positive integer pre-agreed by the BS and the terminal, or a minimum value of a UE-specific DRX cycle.

In a sixteenth embodiment, a base station (BS) determines a PO that includes a narrowband reference signal (NRS), and transmits the NRS in a sub-frame corresponding to the PO. The BS determines the PO according to a value of R, where:

$$R=(\text{PO\_Index}+\text{offset})\mod 2;$$

$$\text{PO\_Index}=(SFN/T*nB+i\_s)\mod nB.$$

When the value of R is 1, the PO corresponding to the PO_index is a PO including the NRS. The value of the offset is determined based on:

$$\text{offset} = \sum_{i=1}^{N}(n)div(T_i) + N_{ID}^{cell}, n = SFN + 1024*H\_SFN,$$

where $T_i$ represents all values based on a cell-specific DRX cycle; nB, i-s, T are values configured by signaling; SFN is an index of a system radio frame where the PO is located; the H-SFN is an index of a hyper frame where the PO is located; k and K are values pre-agreed by the BS and the terminal; and $N_{ID}^{cell}$ is the cell index.

In a seventeenth embodiment, a terminal determines a PO that includes an NRS, and receives the NRS in a sub-frame corresponding to the PO. The terminal determines the PO according to a value of R, where:

$$R=(\text{PO\_Index}+\text{offset})\mod 2;$$

$$\text{PO\_Index}=(SFN/T*nB+i\_s)\mod nB.$$

When the value of R is 1, the PO corresponding to the PO_index is a PO including the NRS. The value of the offset is determined based on:

$$\text{offset} = \sum_{i=0}^{k} c(K*n+i)*2^i, n = SFN + 1024*H\_SFN, c_{init} = N_{ID}^{cell},$$

$$\text{or } n = 0, c_{init} = \text{mod}((SFN + 1024*H\_SFN)divT)*2^9 + N_{ID}^{cell}.$$

where nB, i-s, T are values configured by signaling; SFN is an index of a system radio frame where the PO is located; the H-SFN is an index of a hyper frame where the PO is located; k and K are values pre-agreed by the BS and the terminal; and $N_{ID}^{cell}$ is the cell index. T may be: a current value of a cell-specific DRX cycle, a maximum value of a cell-specific DRX cycle, a minimum value of a cell-specific DRX cycle, a maximum value of a UE-specific DRX cycle, a positive integer pre-agreed by the BS and the terminal, or a minimum value of a UE-specific DRX cycle.

In an eighteenth embodiment, a terminal determines a PO that includes an NRS, and receives the NRS in a sub-frame corresponding to the PO. The terminal determines the PO according to a value of R, where:

R=(PO_Index+offset)mod 2;

PO_Index=(SFN/$T*nB+i\_s$)mod $nB$.

When the value of R is 1, the PO corresponding to the PO_index is a PO including the NRS. The value of the offset is determined based on:

$$\text{offset} = \sum_{i=1}^{N} (n)div(T_i) + N_{ID}^{cell}, n = SFN + 1024*H\_SFN, c_{init} = N_{ID}^{cell},$$

where $T_i$ represents all values based on a cell-specific DRX cycle; nB, i-s, T are values configured by signaling; SFN is an index of a system radio frame where the PO is located; the H-SFN is an index of a hyper frame where the PO is located; k and K are values pre-agreed by the BS and the terminal; and $N_{ID}^{cell}$ is the cell index.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a wireless communication node, the method comprising:
   determining an initial transmission resource for wake-up signal (WUS) transmission;
   determining an updated transmission resource for WUS transmission based at least on the initial transmission resource and an offset; and
   transmitting, on the updated transmission resource, a WUS to at least one wireless communication device, wherein the offset is selected from a plurality of pre-determined values based on a location of a paging occasion (PO) corresponding to the WUS.

2. The method of claim 1, wherein:
   determining the initial transmission resource comprises determining an initial index of the initial transmission resource; and
   determining the updated transmission resource comprises determining an updated index of the updated transmission resource based on: the initial index, the offset, and a quantity of transmission resources in a resource set for WUS transmission corresponding to a location gap between the WUS and the PO.

3. The method of claim 2, wherein the quantity is one, and the resource set includes a single transmission resource that is different from a legacy transmission resource.

4. The method of claim 1, wherein determining the updated transmission resource comprises:
   determining an initial value for a pseudo random sequence;
   generating the pseudo random sequence based on the initial value;
   selecting a portion from the pseudo random sequence; and
   calculating the offset based on the selected portion.

5. The method of claim 4, wherein the initial value is determined based on at least one of:
   an identity (ID) of a cell where the at least one wireless communication device is located;
   a current value of a discontinuous reception (DRX) cycle specific to the cell;
   a maximum value of the DRX cycle specific to the cell;
   a minimum value of the DRX cycle specific to the cell;
   a maximum value of a DRX cycle specific to the at least one wireless communication device; and
   a minimum value of the DRX cycle specific to the at least one wireless communication device.

6. The method of claim 4, wherein the portion is selected based on at least one of:
   a system frame number (SFN) of the PO corresponding to the WUS;
   a Hyper-SFN (H-SFN) of the PO corresponding to the WUS;
   a sub-frame number of the PO corresponding to the WUS;
   an identity (ID) of a cell where the at least one wireless communication device is located;
   a discontinuous reception (DRX) cycle specific to the cell; and
   a DRX cycle specific to the at least one wireless communication device.

7. The method of claim 4, wherein the initial value is determined based on at least one of:
   a system frame number (SFN) of the PO corresponding to the WUS;
   a Hyper-SFN (H-SFN) of the PO corresponding to the WUS;
   a sub-frame number of the PO corresponding to the WUS;
   an identity (ID) of a cell where the at least one wireless communication device is located;
   a discontinuous reception (DRX) cycle specific to the cell; and
   a DRX cycle specific to the at least one wireless communication device.

8. The method of claim 1, wherein determining the updated transmission resource comprises calculating the offset based on at least one of:
   a system frame number (SFN) of the PO corresponding to the WUS;
   a Hyper-SFN (H-SFN) of the PO corresponding to the WUS;
   a sub-frame number of the PO corresponding to the WUS;
   an identity (ID) of a cell where the at least one wireless communication device is located;
   a current value of a discontinuous reception (DRX) cycle specific to the cell;
   a maximum value of the DRX cycle specific to the cell;
   a minimum value of the DRX cycle specific to the cell;
   a maximum value of a DRX cycle specific to the at least one wireless communication device;
   a minimum value of the DRX cycle specific to the at least one wireless communication device; and
   at least one pre-determined integer.

9. The method of claim 1, wherein:
   the offset is determined based on a system frame number (SFN) of the PO corresponding to the WUS;

the offset changes by one as the SFN changes by T, which is a maximum value of a DRX cycle or a predetermined value; and a value of the offset corresponding to a value of SFN in a current cycle of T is determined based on a value of the offset corresponding to a value of SFN in a previous cycle of T.

10. A method performed by a wireless communication device, the method comprising:
obtaining information about an initial transmission resource for wake-up signal (WUS) detection;
determining an updated transmission resource for WUS detection based at least on the initial transmission resource and an offset; and
detecting, on the updated transmission resource, a WUS transmitted from a wireless communication node, wherein the offset is selected from a plurality of pre-determined values based on a location of a paging occasion (PO) corresponding to the WUS.

11. The method of claim 10, wherein:
obtaining information about an initial transmission resource comprises obtaining an initial index of the initial transmission resource based on a signaling from the wireless communication node or based on a group to which the wireless communication device belongs for WUS detection; and
determining the updated transmission resource comprises determining an updated index of the updated transmission resource based on: the initial index, the offset, and a quantity of transmission resources in a resource set for WUS detection corresponding to a location gap between the WUS and the PO.

12. The method of claim 10, wherein determining the updated transmission resource comprises:
determining an initial value for a pseudo random sequence;
generating the pseudo random sequence based on the initial value;
selecting a portion from the pseudo random sequence; and
calculating the offset based on the selected portion.

13. The method of claim 12, wherein the initial value is determined based on at least one of:
an identity (ID) of a cell where the wireless communication device is located;
a current value of a discontinuous reception (DRX) cycle specific to the cell;
a maximum value of the DRX cycle specific to the cell;
a minimum value of the DRX cycle specific to the cell;
a maximum value of a DRX cycle specific to the wireless communication device; and
a minimum value of the DRX cycle specific to the wireless communication device.

14. The method of claim 12, wherein the portion is selected based on at least one of:
a system frame number (SFN) of the PO corresponding to the WUS;
a Hyper-SFN (H-SFN) of the PO corresponding to the WUS;
a sub-frame number of the PO corresponding to the WUS;
an identity (ID) of a cell where the wireless communication device is located;
a discontinuous reception (DRX) cycle specific to the cell; and
a DRX cycle specific to the wireless communication device.

15. The method of claim 12, wherein the initial value is determined based on at least one of:

a system frame number (SFN) of the PO corresponding to the WUS;
a Hyper-SFN (H-SFN) of the PO corresponding to the WUS;
a sub-frame number of the PO corresponding to the WUS;
an identity (ID) of a cell where the wireless communication device is located;
a discontinuous reception (DRX) cycle specific to the cell; and
a DRX cycle specific to the wireless communication device.

16. The method of claim 10, wherein determining the updated transmission resource comprises calculating the offset based on at least one of:
a system frame number (SFN) of the PO corresponding to the WUS;
a Hyper-SFN (H-SFN) of the PO corresponding to the WUS;
a sub-frame number of the PO corresponding to the WUS;
an identity (ID) of a cell where the wireless communication device is located;
a current value of a discontinuous reception (DRX) cycle specific to the cell;
a maximum value of the DRX cycle specific to the cell;
a minimum value of the DRX cycle specific to the cell;
a maximum value of a DRX cycle specific to the wireless communication device;
a minimum value of the DRX cycle specific to the wireless communication device; and
at least one pre-determined integer.

17. The method of claim 16, wherein the offset is calculated based on at least one of: a modulo operation, a division operation, and a floor function.

18. The method of claim 10, wherein:
the offset is determined based on a system frame number (SFN) of the PO corresponding to the WUS;
the offset changes by one as the SFN changes by T, which is a maximum value of a DRX cycle or a predetermined value; and
a value of the offset corresponding to a value of SFN in a current cycle of T is determined based on a value of the offset corresponding to a value of SFN in a previous cycle of T.

19. A wireless communication device comprising:
a memory storing a plurality of instructions; and
a processor configured to execute the plurality of instructions, and upon execution of the plurality of instructions, is configured to:
determine an initial transmission resource for wake-up signal (WUS) transmission;
determine an updated transmission resource for WUS transmission based at least on the initial transmission resource and an offset; and
transmit, on the updated transmission resource, a WUS to at least one wireless communication device, wherein the offset is selected from a plurality of predetermined values based on a location of a paging occasion (PO) corresponding to the WUS.

20. A wireless communication device comprising:
a memory storing a plurality of instructions; and
a processor configured to execute the plurality of instructions, and upon execution of the plurality of instructions, is configured to:

obtain information about an initial transmission resource for wake-up signal (WUS) detection;

determine an updated transmission resource for WUS detection based at least on the initial transmission resource and an offset; and detect, on the updated transmission resource, a WUS transmitted from a wireless communication node, wherein the offset is selected from a plurality of predetermined values based on a location of a paging occasion (PO) corresponding to the WUS.

* * * * *